Figure 1:
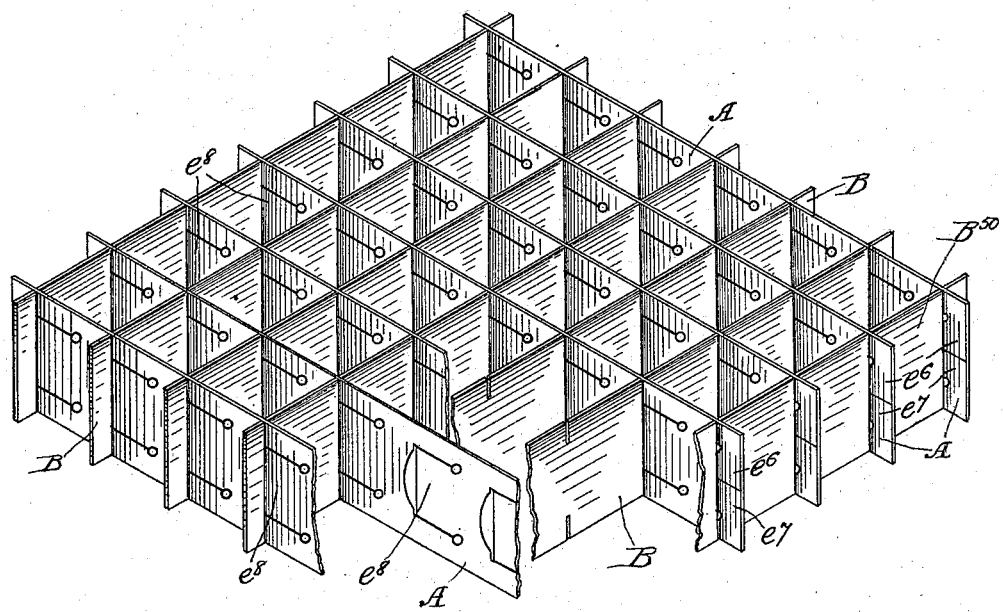

(No Model.) 22 Sheets—Sheet 1.

W. E. WILLIAMS.
MACHINERY FOR MANUFACTURING CELL CASES.

No. 573,947. Patented Dec. 29, 1896.

WITNESSES:

INVENTOR:

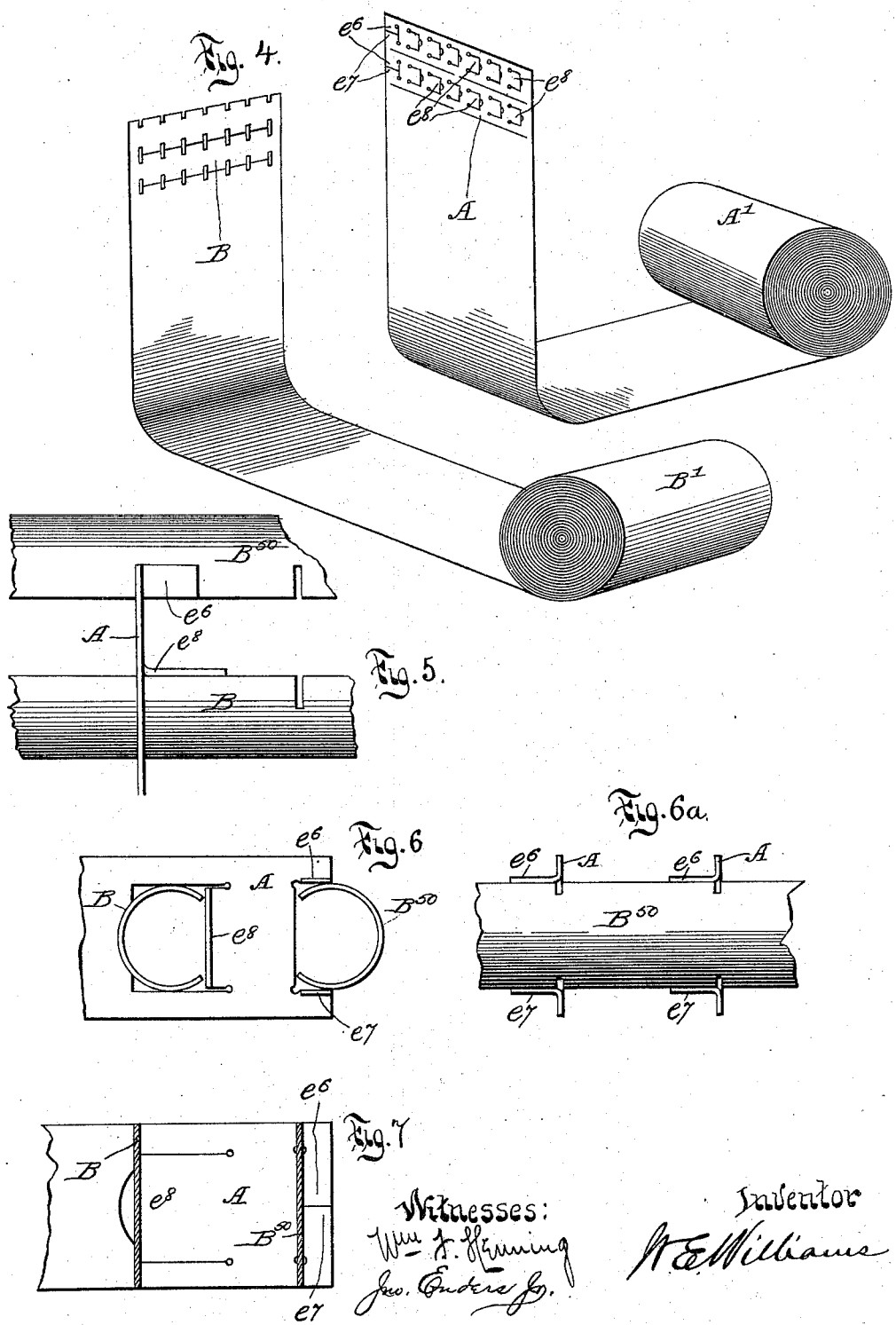

(No Model.)  22 Sheets—Sheet 3.

W. E. WILLIAMS.
MACHINERY FOR MANUFACTURING CELL CASES.

No. 573,947. Patented Dec. 29, 1896.

Witnesses:
Inventor (No Model.) 22 Sheets—Sheet 7.

W. E. WILLIAMS.
MACHINERY FOR MANUFACTURING CELL CASES.

No. 573,947. Patented Dec. 29, 1896.

Witnesses:

Inventor (No Model.) 22 Sheets—Sheet 10.
W. E. WILLIAMS.
MACHINERY FOR MANUFACTURING CELL CASES.

No. 573,947. Patented Dec. 29, 1896.

(No Model.)
W. E. WILLIAMS.
MACHINERY FOR MANUFACTURING CELL CASES.
No. 573,947. Patented Dec. 29, 1896.
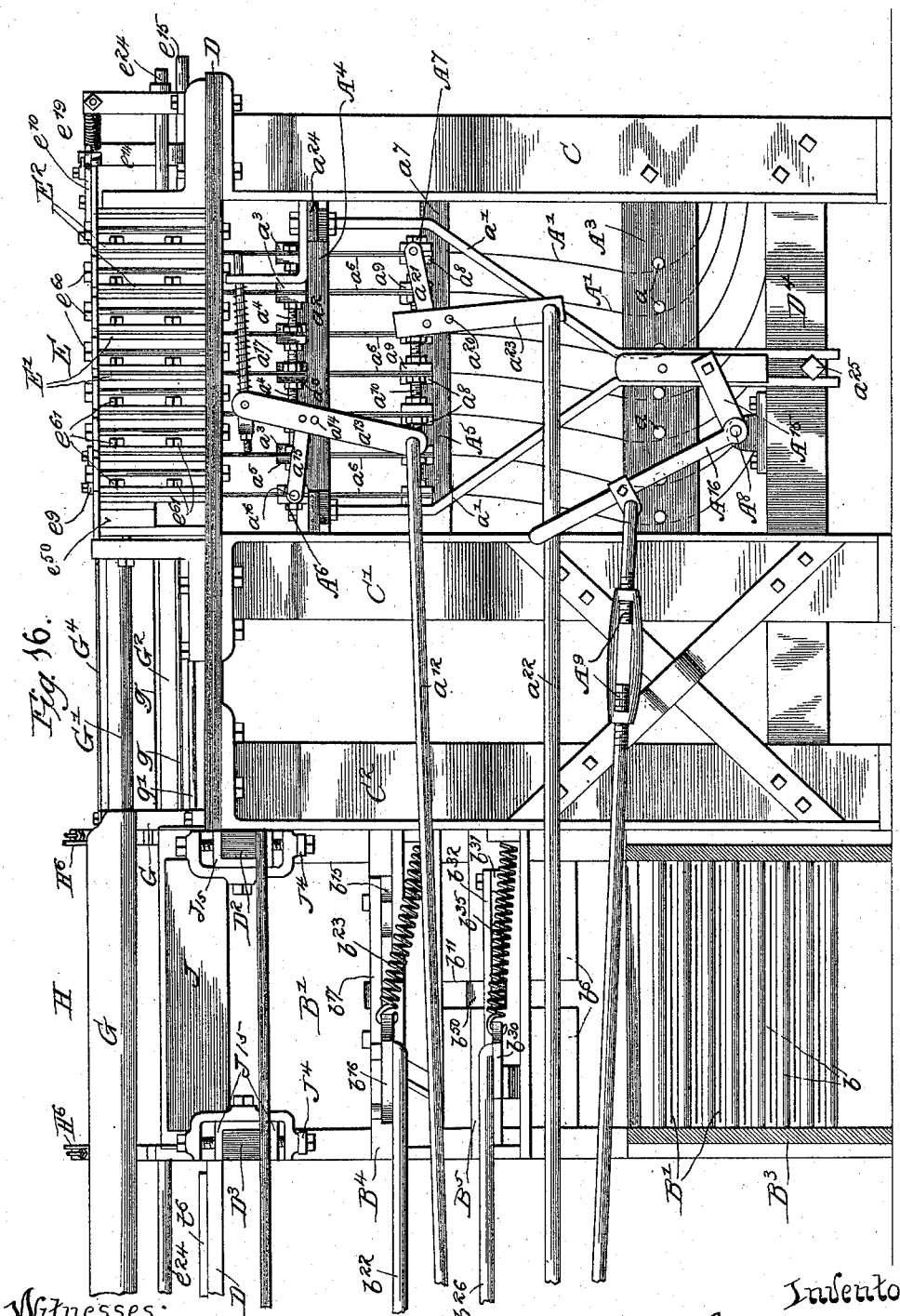
Witnesses:
Inventor
W. E. Williams (No Model.) 22 Sheets—Sheet 12.
W. E. WILLIAMS.
MACHINERY FOR MANUFACTURING CELL CASES.
No. 573,947. Patented Dec. 29, 1896.
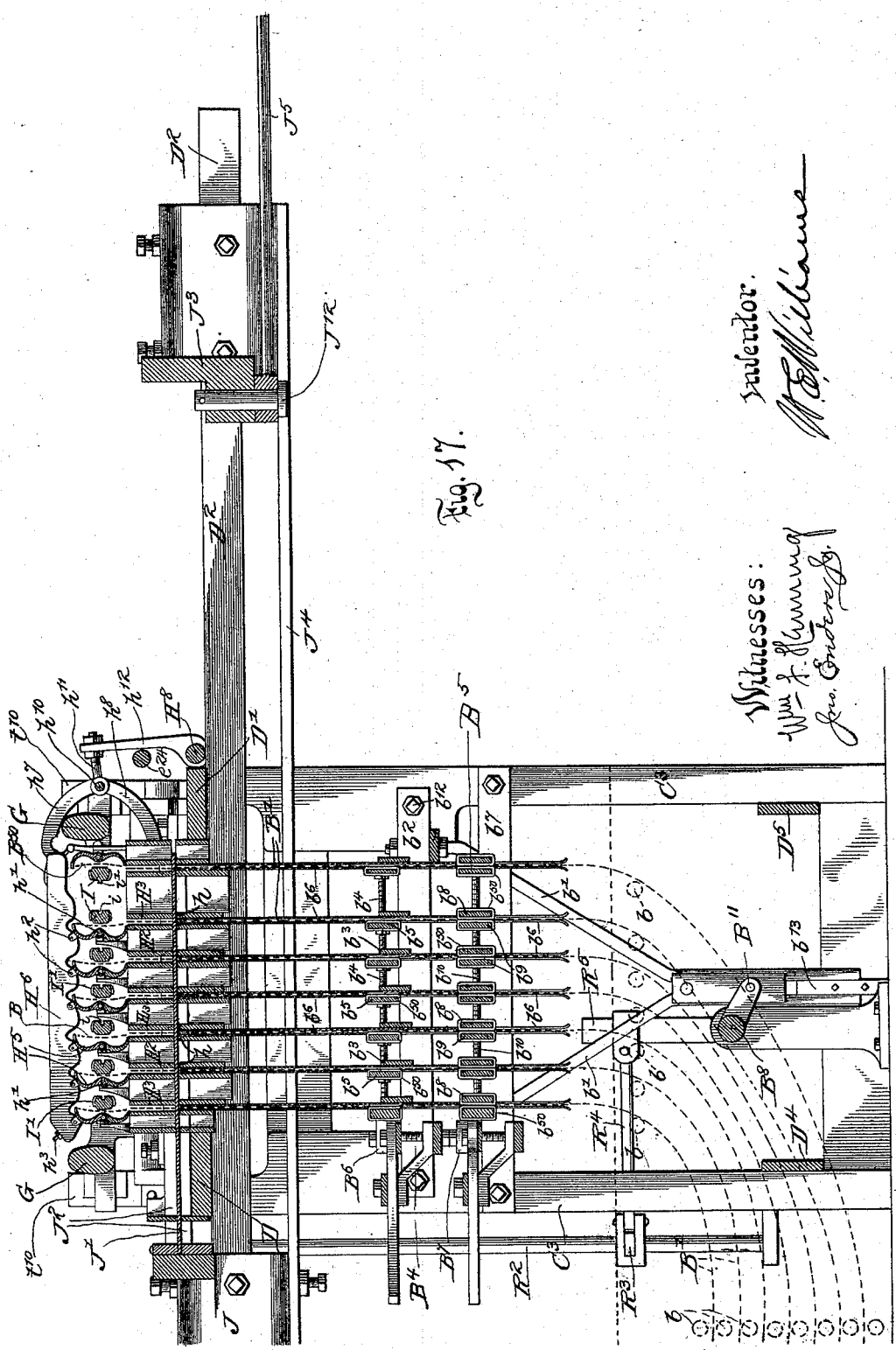

(No Model.) 22 Sheets—Sheet 13.
W. E. WILLIAMS.
MACHINERY FOR MANUFACTURING CELL CASES.
No. 573,947. Patented Dec. 29, 1896.
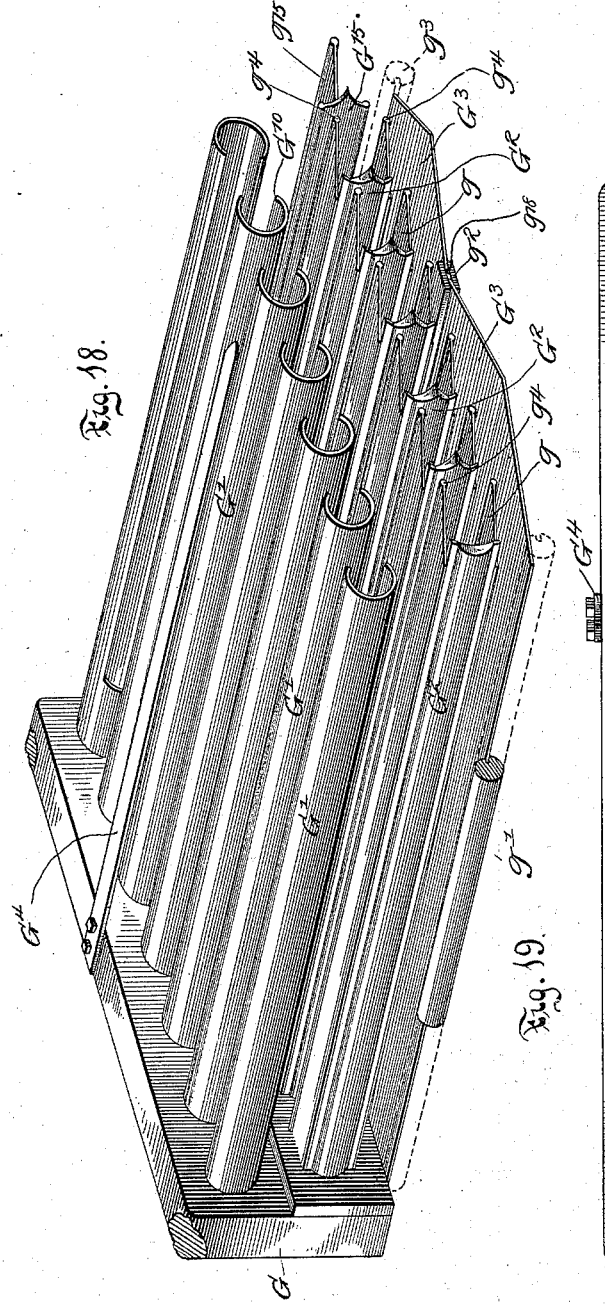
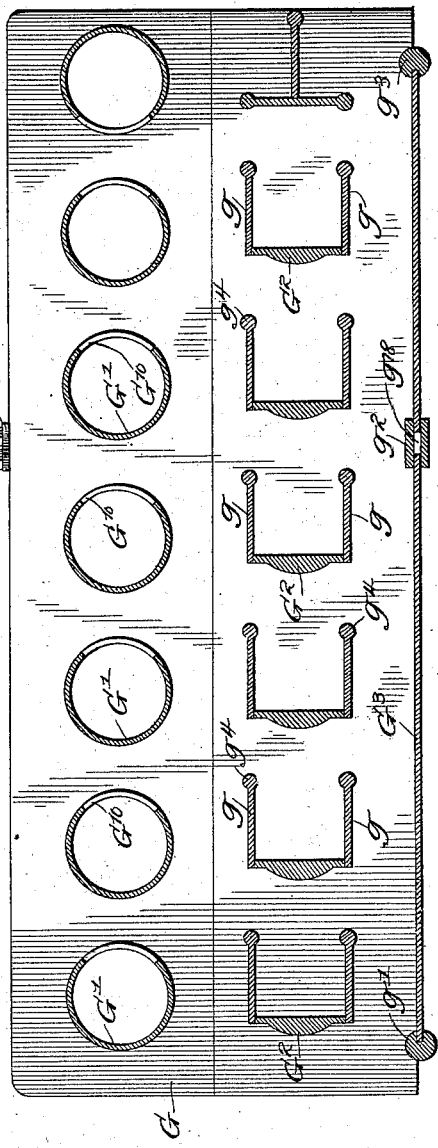

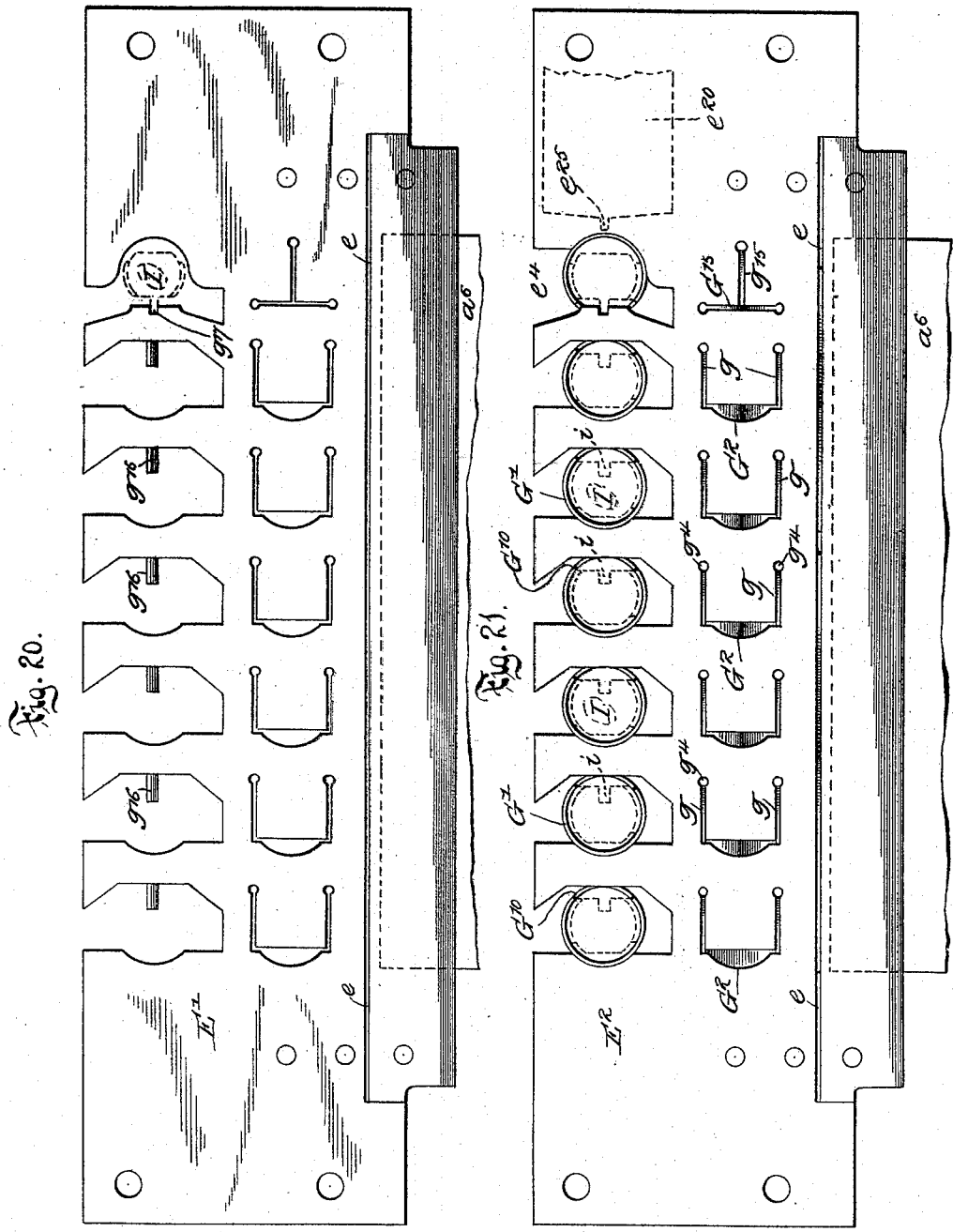
(No Model.) W. E. WILLIAMS. 22 Sheets—Sheet 14.
MACHINERY FOR MANUFACTURING CELL CASES.
No. 573,947. Patented Dec. 29, 1896.

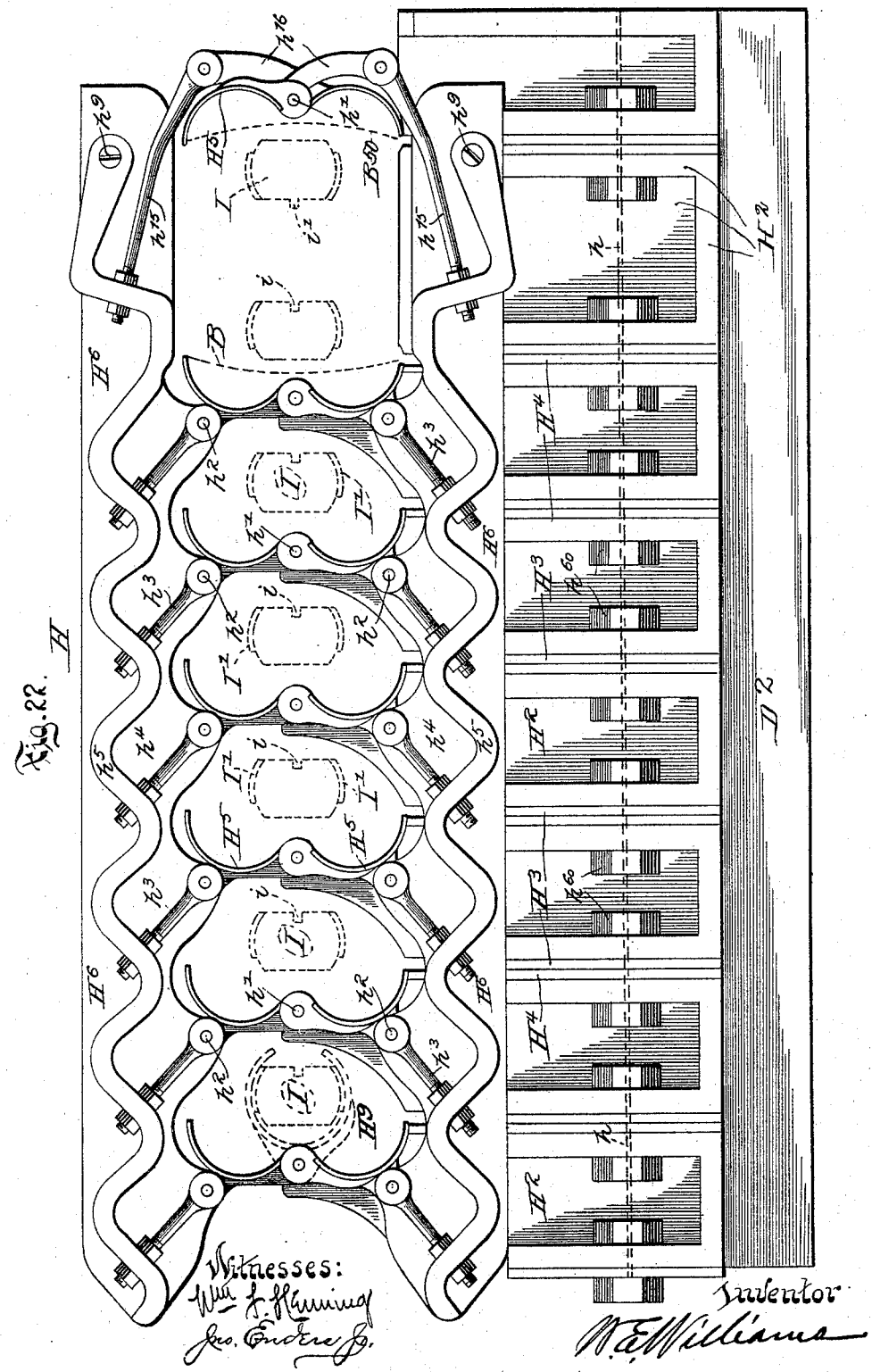

(No Model.)
W. E. WILLIAMS.
MACHINERY FOR MANUFACTURING CELL CASES.
No. 573,947. Patented Dec. 29, 1896.
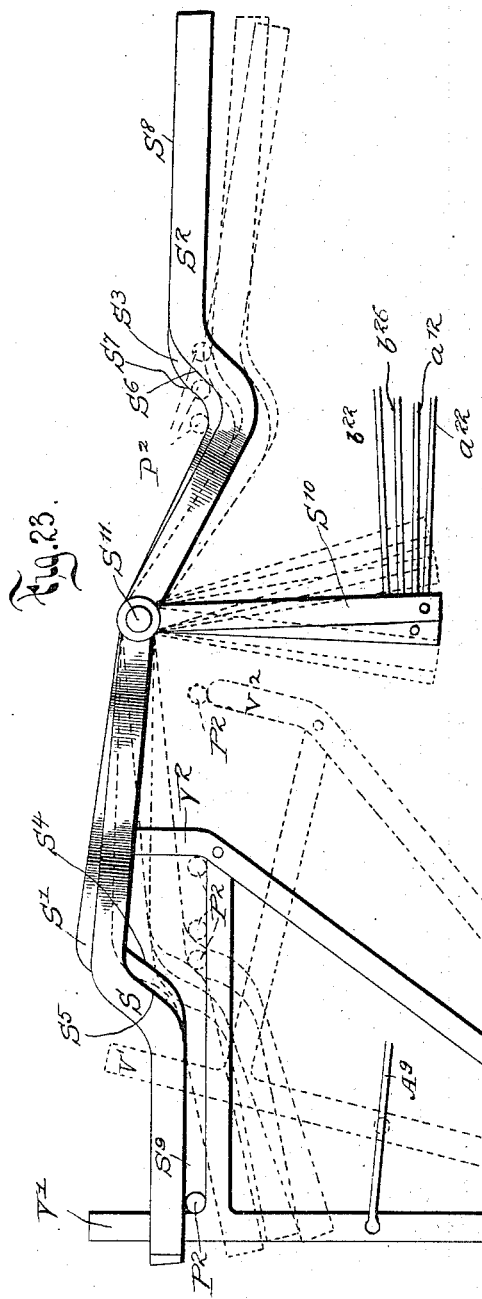
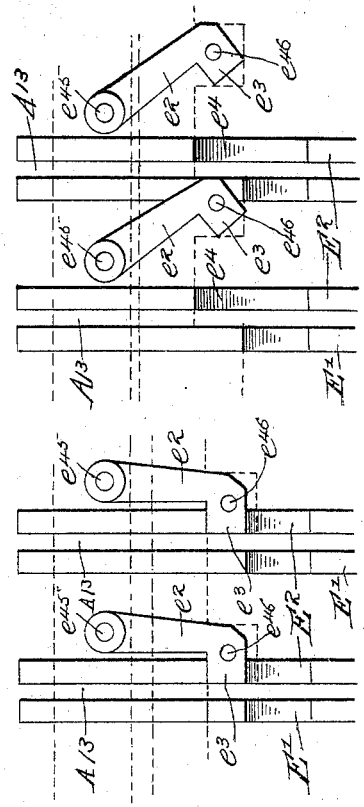
Witnesses:
Inventor
W. E. Williams

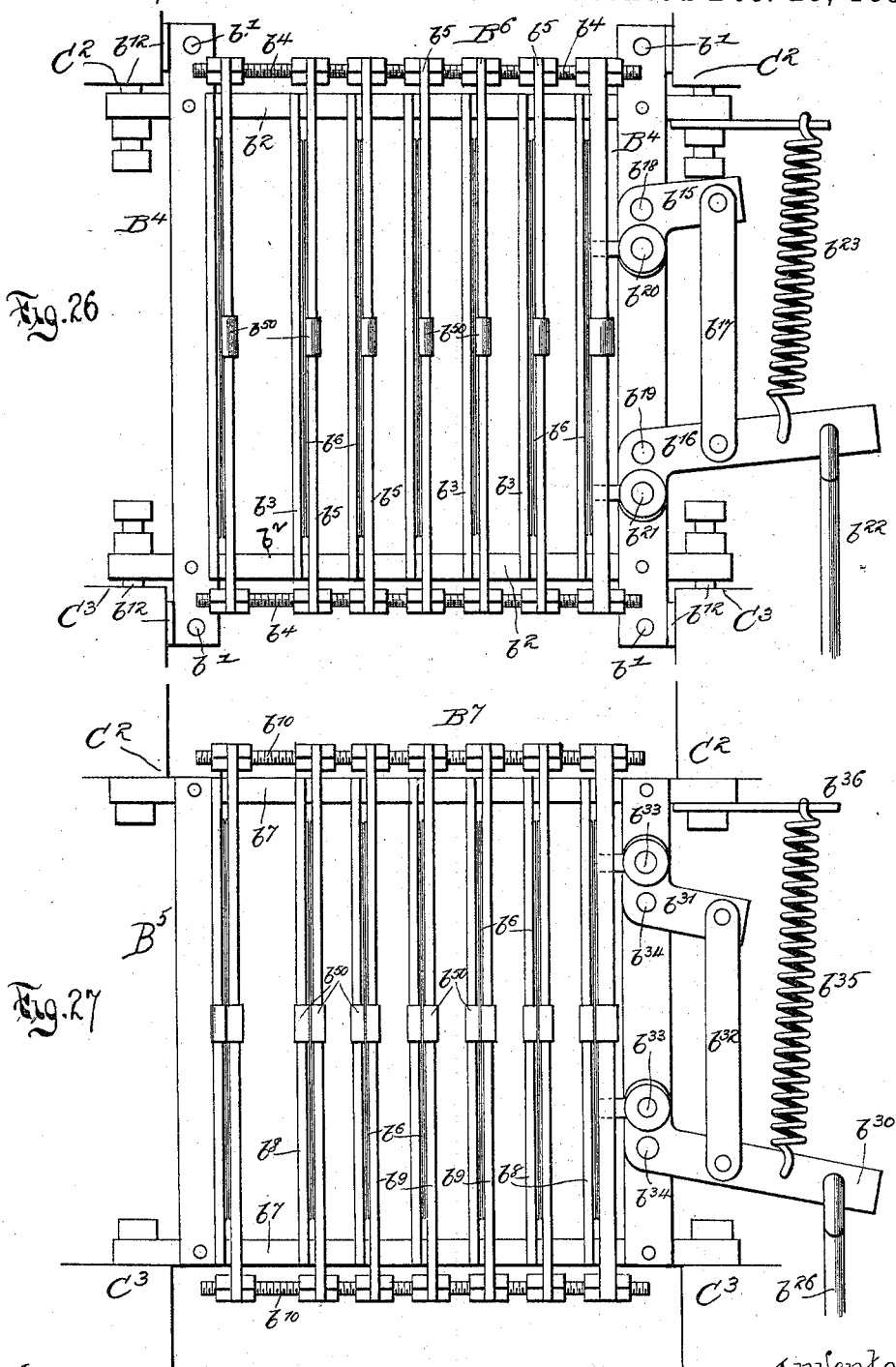

(No Model.) 22 Sheets—Sheet 18.
W. E. WILLIAMS.
MACHINERY FOR MANUFACTURING CELL CASES.
No. 573,947. Patented Dec. 29, 1896.
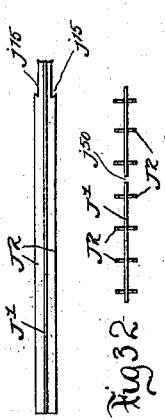
Fig 30.
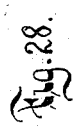
Fig 31.
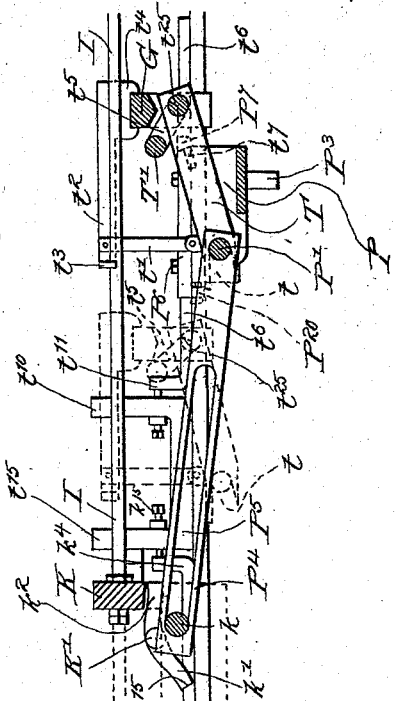
Fig 32.
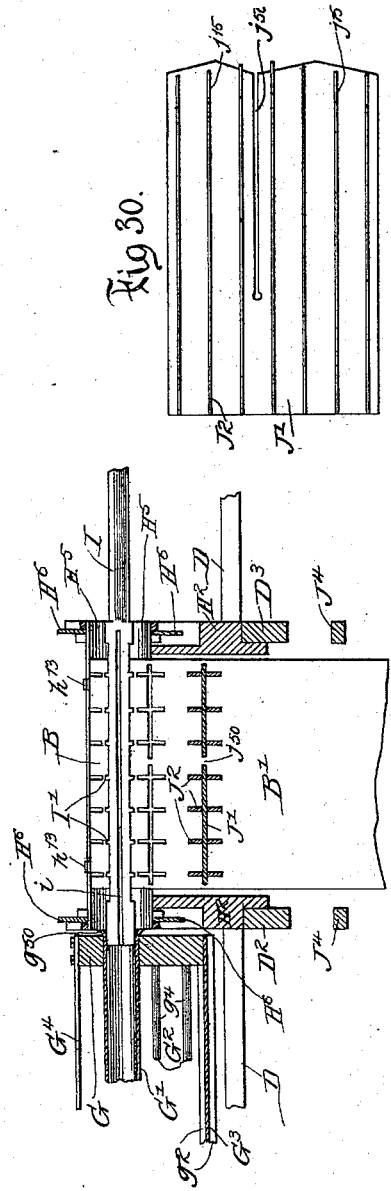
Fig 28.
Fig. 29.
Witnesses:
Wm. F. Hemming
Jno. Enders Jr.
Inventor
W. E. Williams
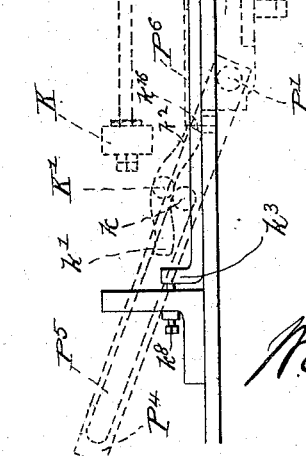
THE NORRIS PETERS CO., PHOTO-LITHO., WASHINGTON, D. C.

(No Model.)

22 Sheets—Sheet 19.

W. E. WILLIAMS.
MACHINERY FOR MANUFACTURING CELL CASES.

No. 573,947.

Patented Dec. 29, 1896.

Witnesses:
Fred Borg.
M. Otis.

Inventor:
W. E. Williams (No Model.) 22 Sheets—Sheet 20.
W. E. WILLIAMS.
MACHINERY FOR MANUFACTURING CELL CASES.
No. 573,947. Patented Dec. 29, 1896.
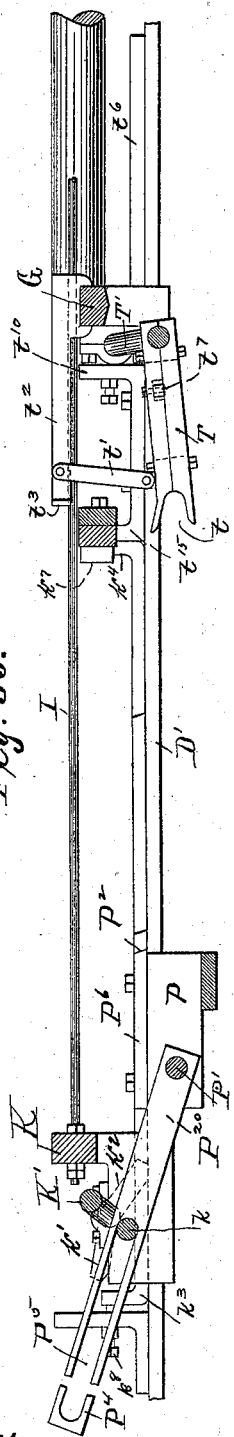
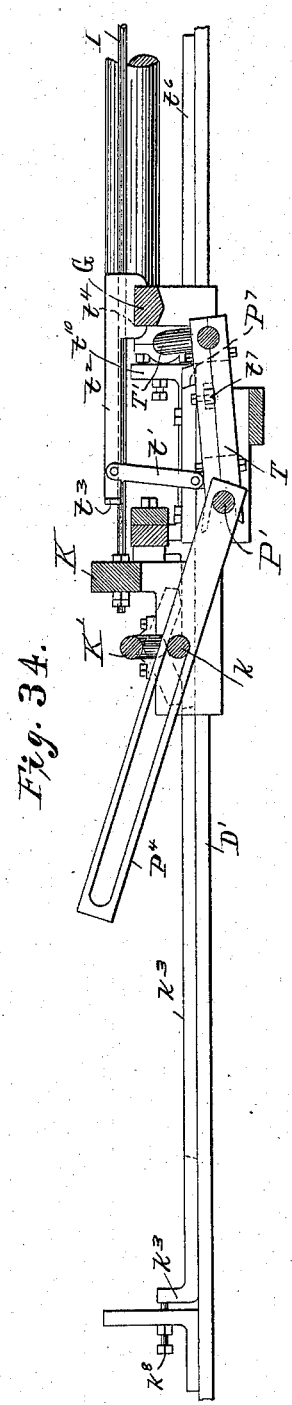
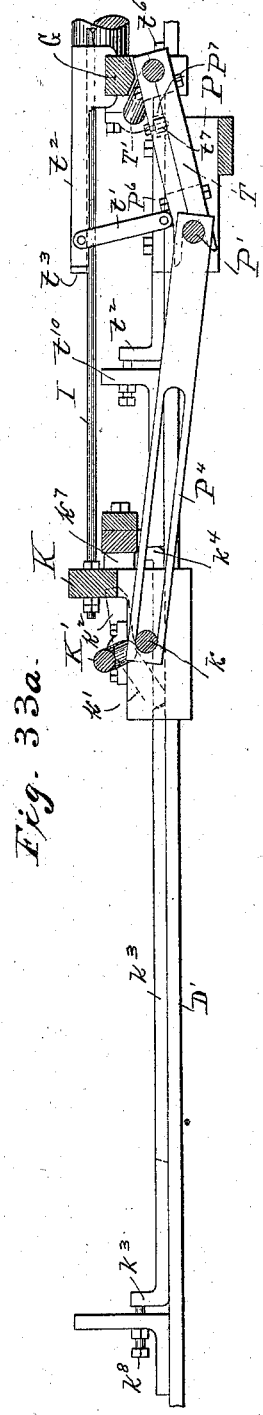
Witnesses:
Fred Borg
M. Otis
Inventor:
W. E. Williams (No Model.) 22 Sheets—Sheet 21.
W. E. WILLIAMS.
MACHINERY FOR MANUFACTURING CELL CASES.
No. 573,947. Patented Dec. 29, 1896.
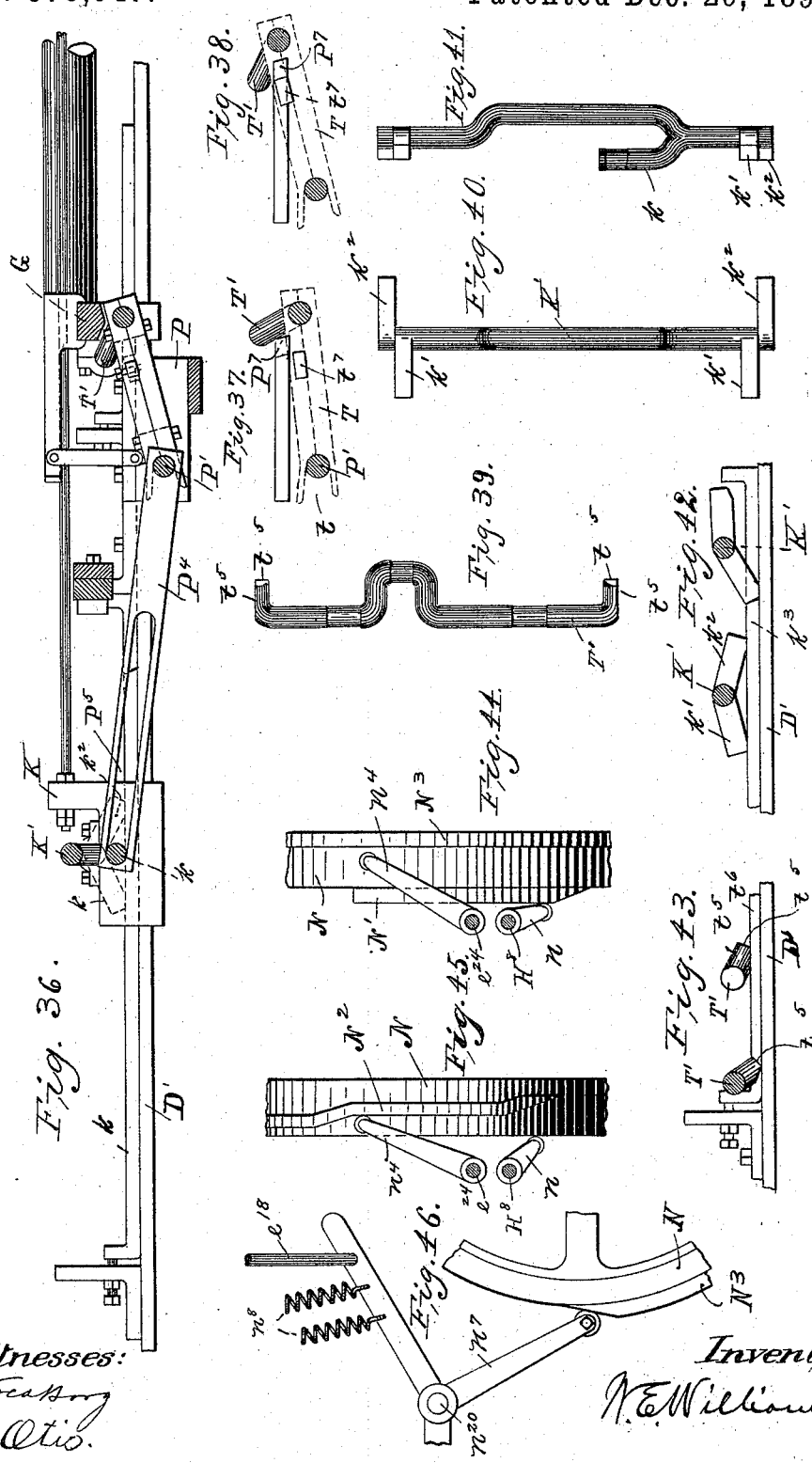
Witnesses:
Inventor:
W. E. Williams (No Model.) 22 Sheets—Sheet 22.
W. E. WILLIAMS.
MACHINERY FOR MANUFACTURING CELL CASES.
No. 573,947. Patented Dec. 29, 1896.
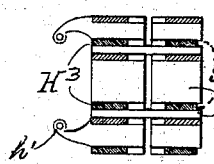
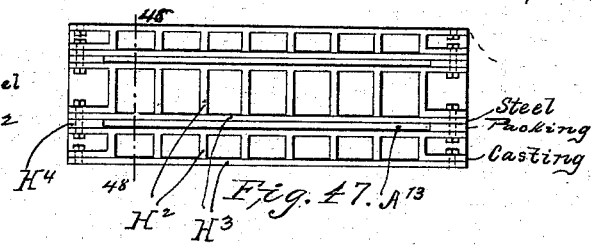
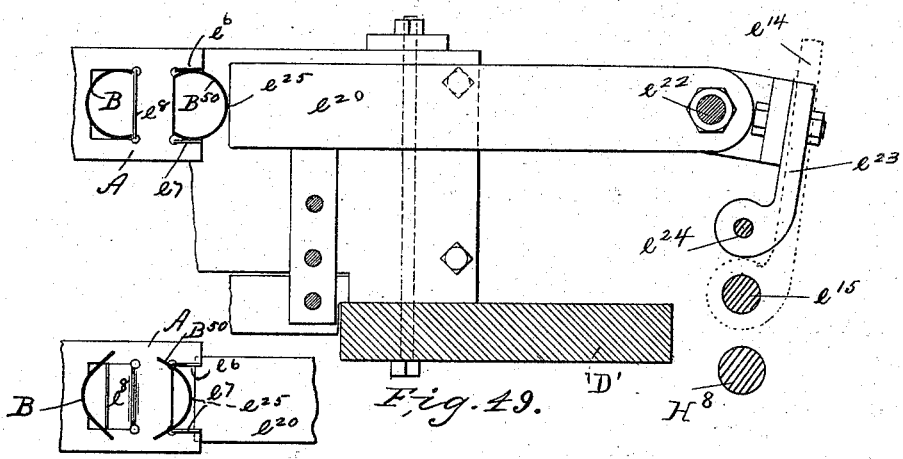
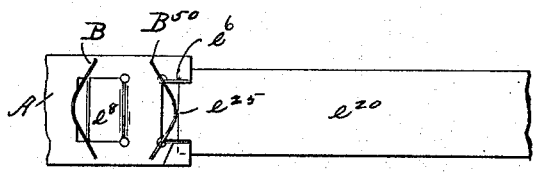
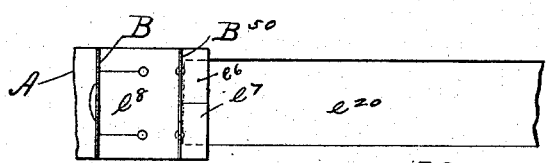
Witnesses:
Fred. Borg.
M. Otis
Inventor:
W. E. Williams

UNITED STATES PATENT OFFICE.

WILLIAM ERASTUS WILLIAMS, OF CHICAGO, ILLINOIS.

MACHINERY FOR MANUFACTURING CELL-CASES.

SPECIFICATION forming part of Letters Patent No. 573,947, dated December 29, 1896.

Application filed April 6, 1893. Serial No. 469,337. (No model.)

*To all whom it may concern:*

Be it known that I, WILLIAM ERASTUS WILLIAMS, a citizen of the United States, residing at Chicago, in the county of Cook and State of Illinois, have invented a new and useful Improvement in Machinery for the Manufacture of Cell-Cases, of which the following is a specification.

My invention relates to machinery for making cell-cases out of strips of strawboard or other suitable material, which strips are locked together transversely, forming rectangular-shaped cells for the transportation of eggs or other articles; and my invention is especially adapted to make cell-cases of the form shown, wherein one set of strips is threaded through another set; and the invention consists in the device and combinations set forth in the claims hereof.

Figure 2:
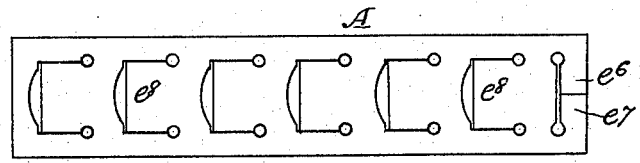
Figure 3:
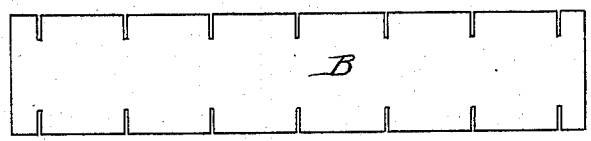
Figure 8:
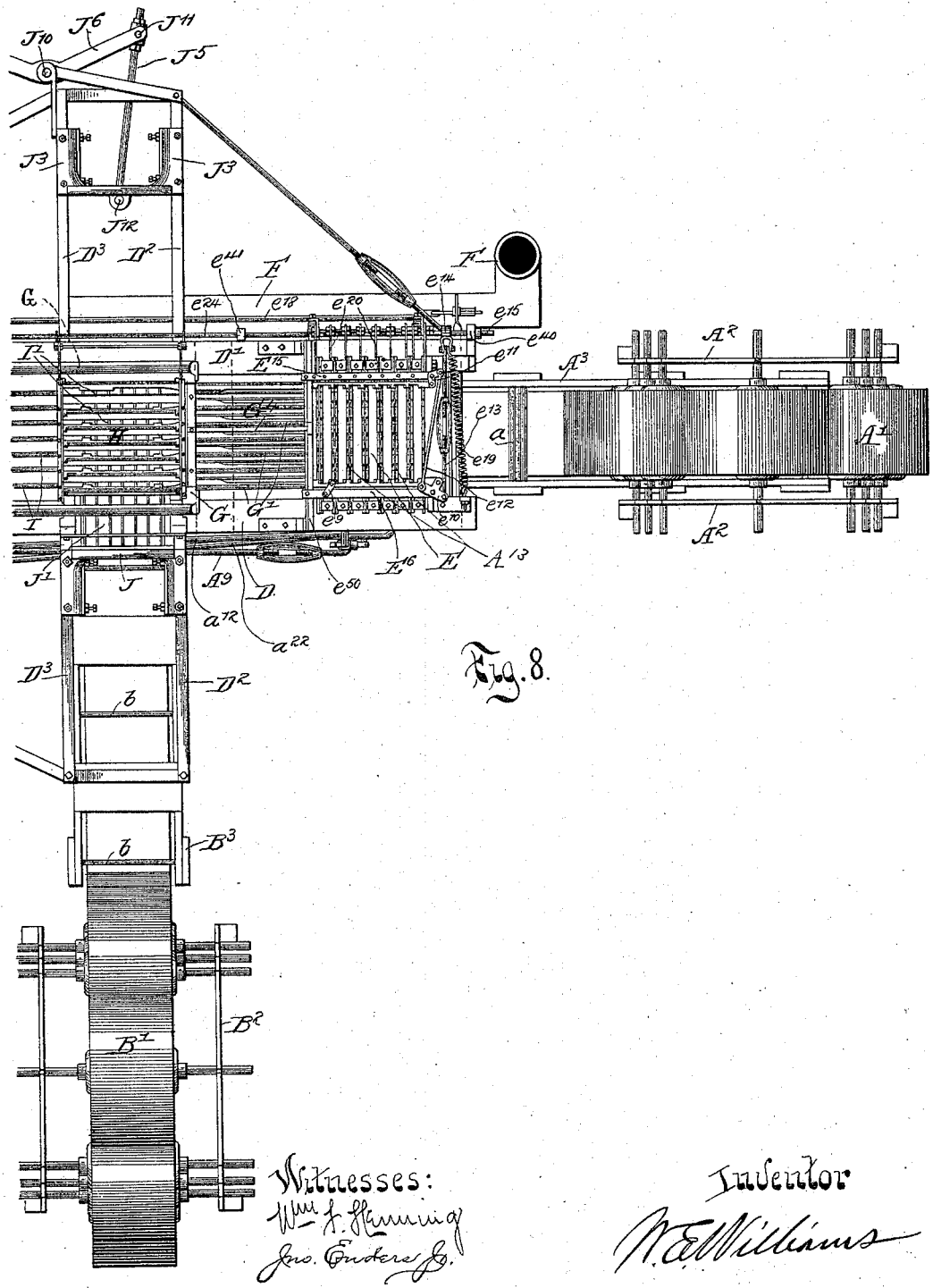
Figure 9:
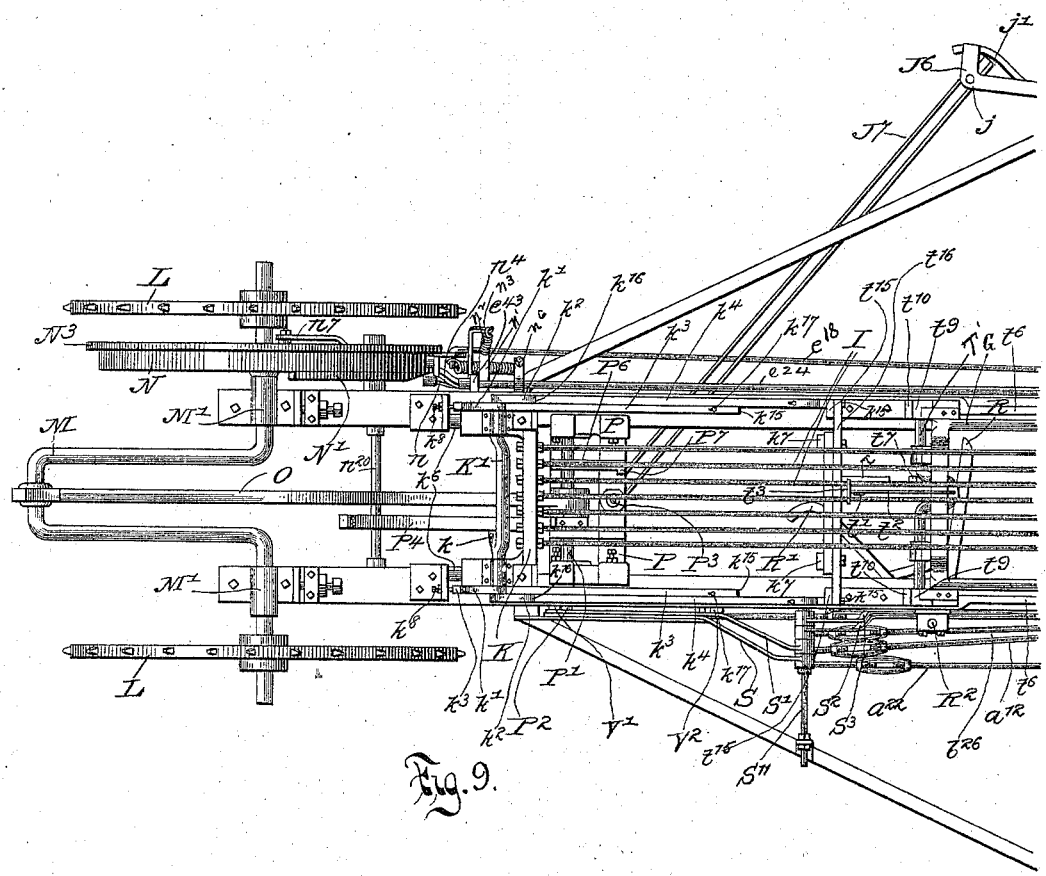
Figure 10:
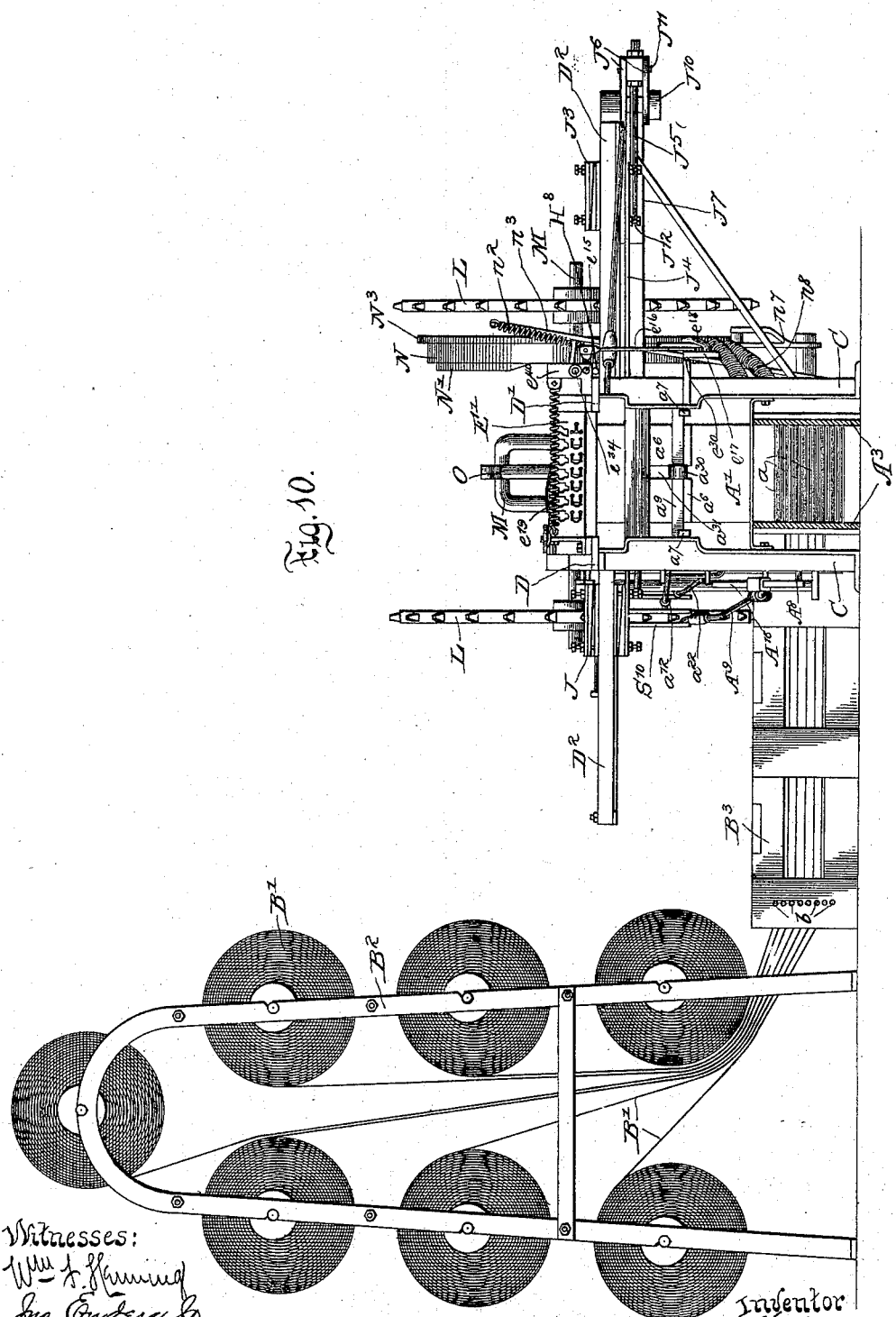
Figure 11:
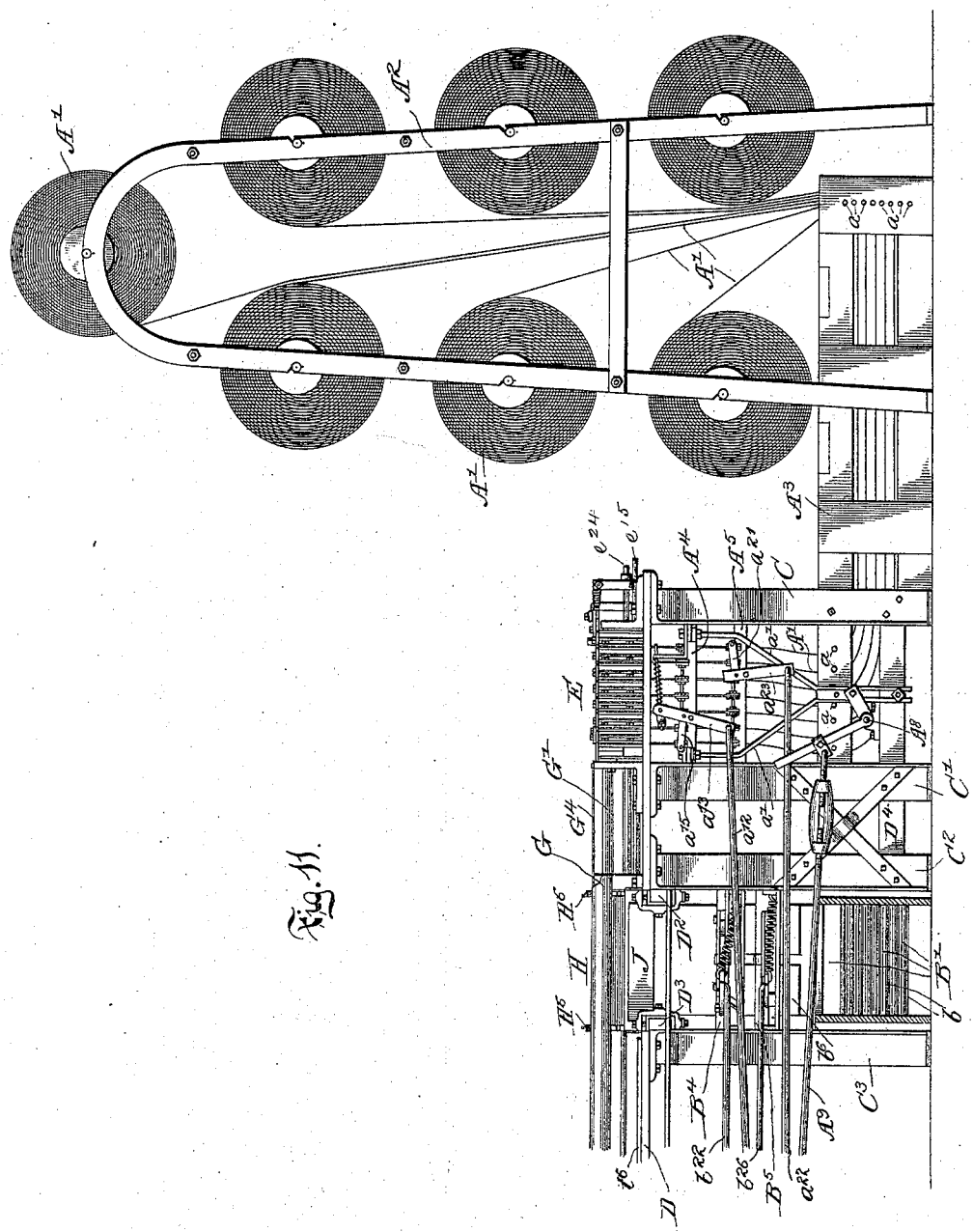
Figure 12:
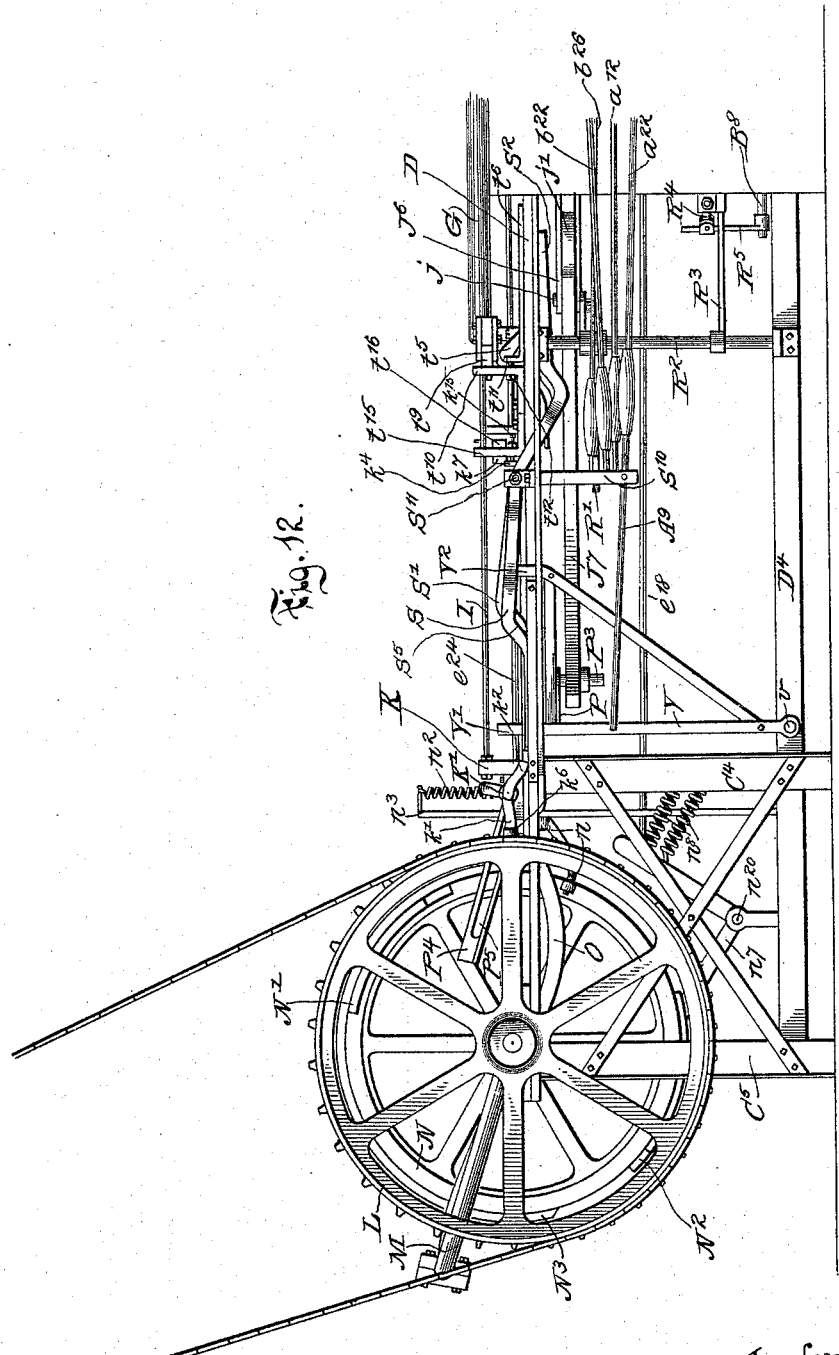
Figure 13:
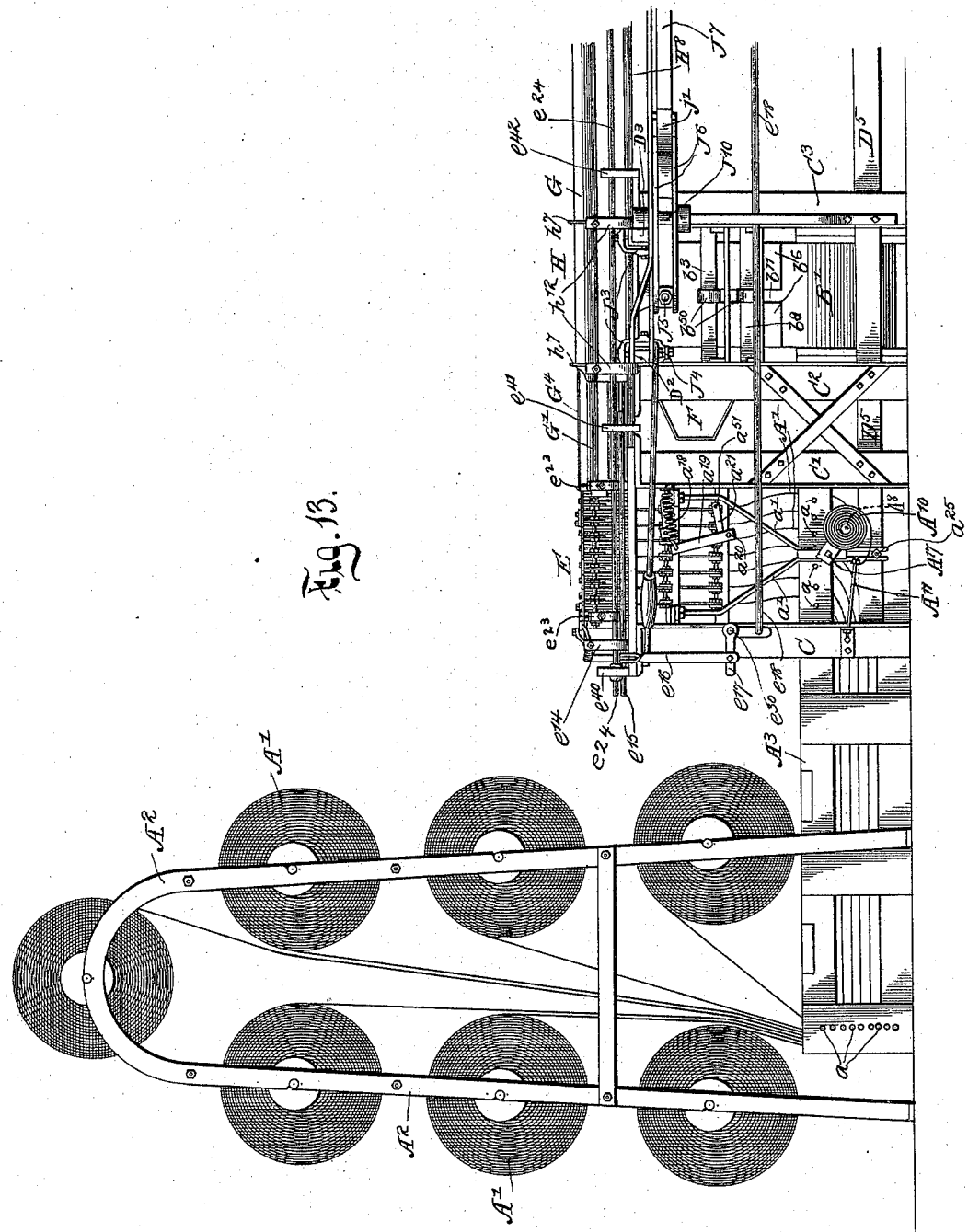
Figure 14:
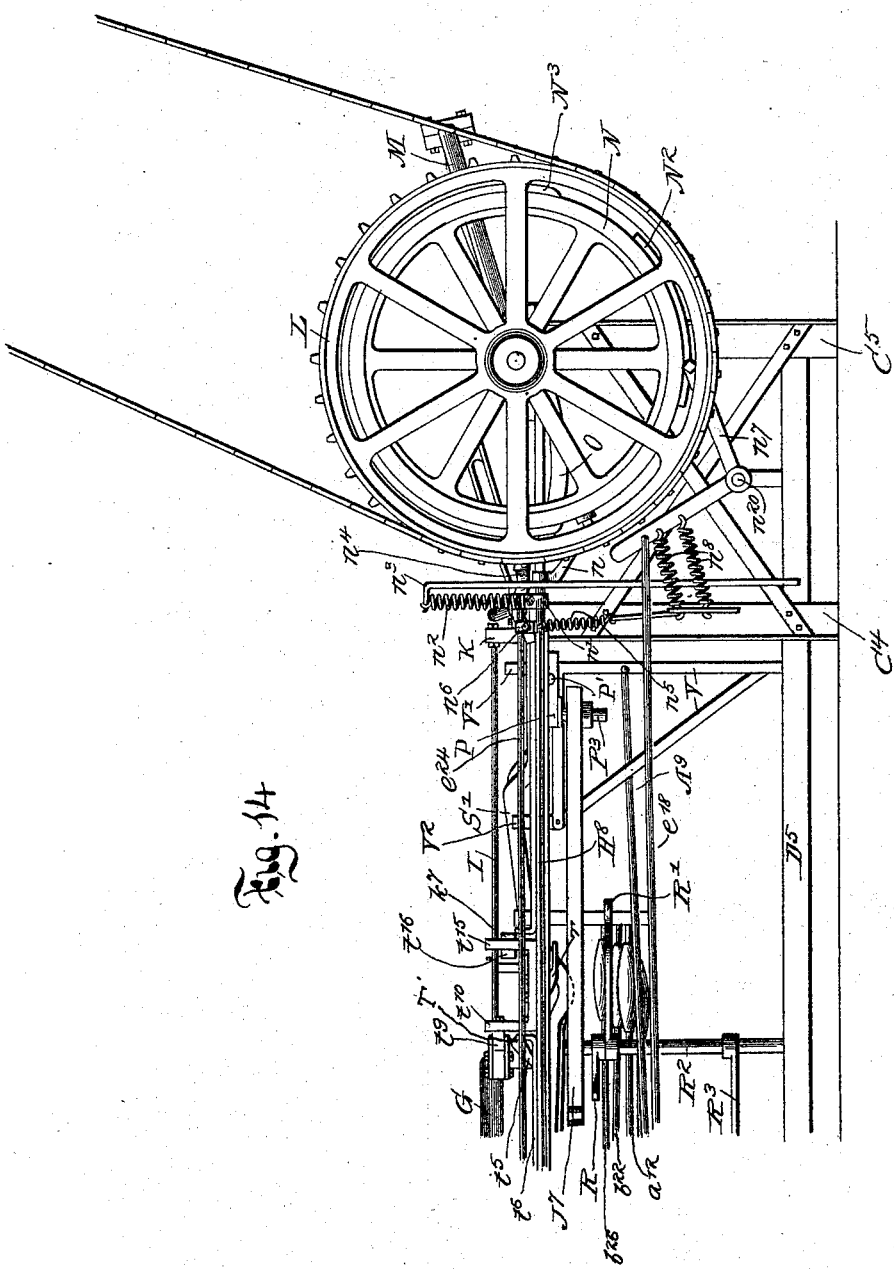
Figure 15:
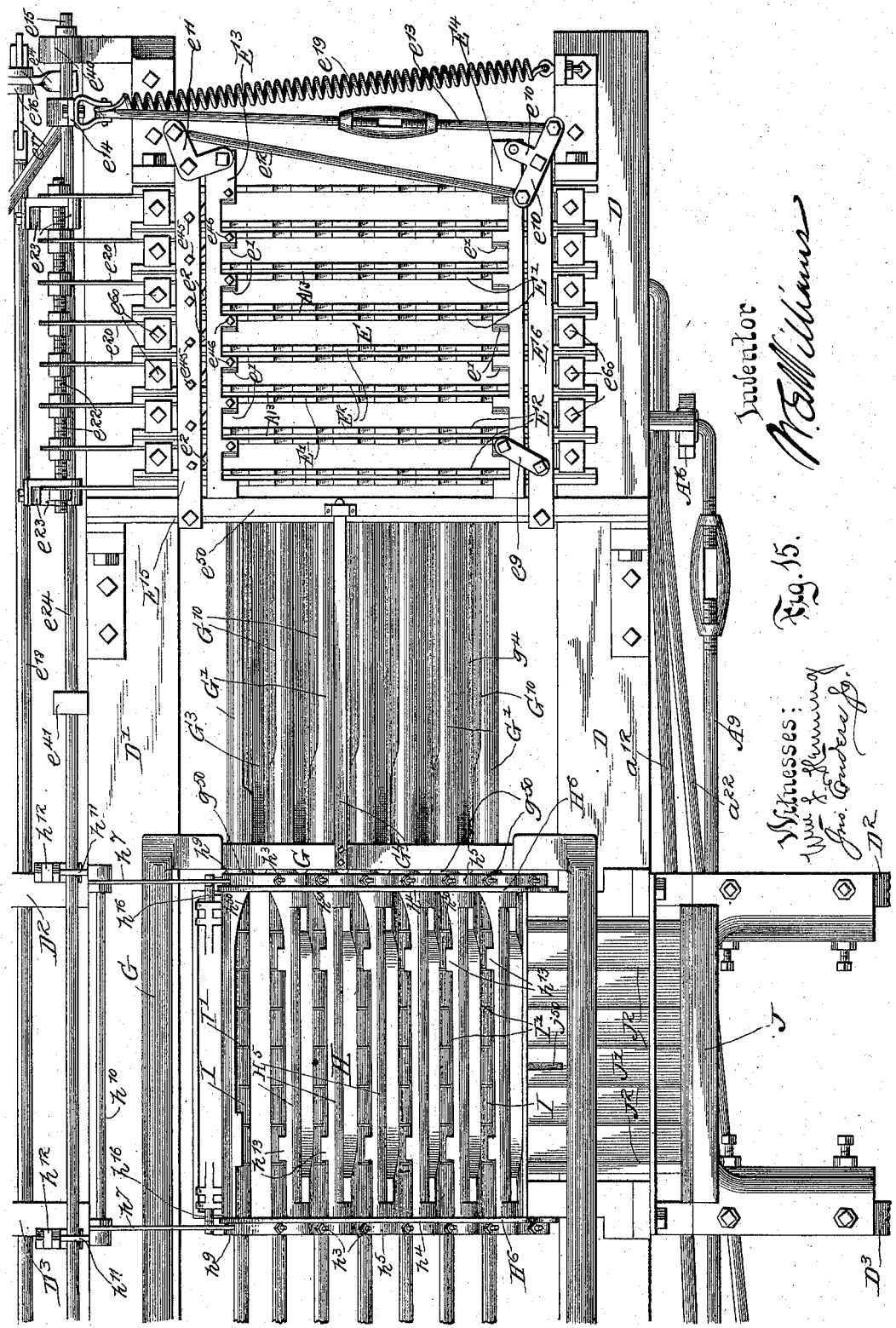
Figure 33:
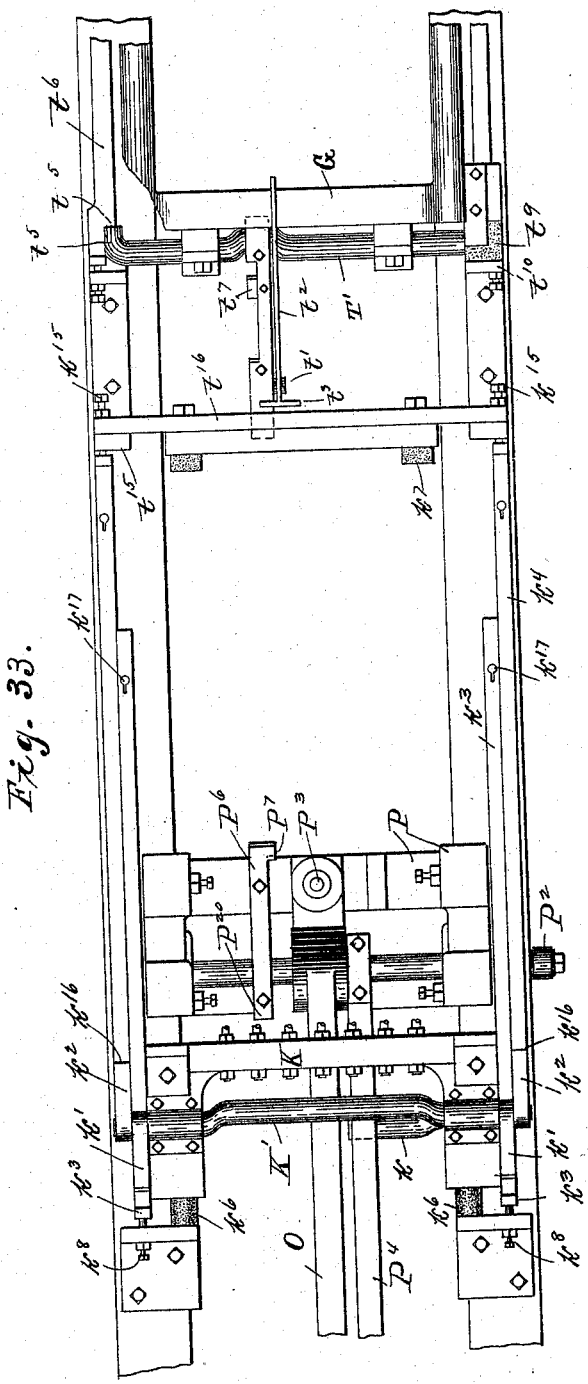

Reference will be had to the accompanying drawings, in which Figure 1 is a perspective sectional view of the completed case. Fig. 2 is a plan of one of the strips, called for convenience of description the "main" strip. Fig. 3 is a plan of the other strip, called the "secondary" strip. To cut these strips and lock them together in the form shown in Fig. 1 is the function of the machine. Fig. 4, Sheet 2, shows two paper-rolls with the free ends of the sheets in the relative positions they have when in the machine. Fig. 5, Sheet 2, is a top view showing a section of the case in the operation of threading the secondary strip through the main strip. Fig. 6, Sheet 2, is an end view of the same. Fig. 6$^a$ is a view looking toward the left in Fig. 6. Fig. 7, Sheet 2, is an end view of the same with the secondary strips righted up when in position. Fig. 8, Sheet 3, is a plan of the front end of the machine. Fig. 9 is a plan of the rear end. Fig. 10 is an end elevation of the machine. Fig. 11 is a side elevation of the left side and front end of the machine. Fig. 12 is the same of the rear end. Fig. 13 is a side elevation of the front end, right side of the machine. Fig. 14 is the same of the rear end. Fig. 15 is an enlarged plan view of the front end of the machine. Fig. 16 is an enlarged view of the left side front end of the machine. Fig. 17 is a transverse section through the folding-nest. Fig. 18 is a perspective view of the tubes, punches, and knives and cross-head holding them. Fig. 19 is a front elevation of the same. Fig. 20 is an enlarged view of the guide-plate of the threading-nest at the front end of the machine. Fig. 21 is the same of the die-plate of the threading-nest, showing the punches and tubes entered. Fig. 22 is an end view of the folding mechanism open to receive the paper. Fig. 23 is an enlarged view of the mechanism which actuates the clamping devices of the feeding mechanism. Fig. 24 is a plan of a portion of the mechanism which holds the outer end of the main strips when the strip $B^{50}$ is being threaded. Fig. 25 shows the same devices, but with the parts in a different position. Fig. 26, Sheet 17, is a plan of the mechanism that clamps the paper in feeding it into the folding-nest. Fig. 27 is a plan of the lower set of clamps in the feeding device of the folding-nest. Fig. 28 is a side sectional view from the right side of the machine, showing in section the tubes and in full lines the needle-rods, the paper B' and the strip B about to be folded. Fig. 29 is a side sectional view showing the connections of the mechanism which drives the tube cross-head and the needle-rod cross-head. Fig. 30 is a plan of the knife and punches of the folding-nest. Fig. 31 is a side view of the same. Fig. 32 is an end view of the same. Fig. 33 is a plan view of devices seen in Figs. 9 and 29. Figs. 33$^a$, 34, 35, and 36 are views similar to Fig. 29, showing different position of moving parts. Figs. 37, 38, 39, 40, 41, 42, and 43 are details of the same mechanism. Figs. 44, 45, and 46 are details of cam mechanism seen in Fig. 9. Figs. 47 and 48 are respectively plan and section of a portion of the folding-nest seen in Figs. 17 and 22. Figs. 49, 50, 51, and 52 show successive positions of the bar which presses the marginal strip of the case laterally to interlock it with the strips of the other set through which it passes.

Similar letters designate similar parts throughout the several views.

For convenience of description I call that part of the machine wherein the secondary strips are cut and folded preparatory to being threaded into the main strips the "folding-nest," (designated by H, Fig. 8, Sheet 3,) and that part of the machine wherein the main strips are cut and the secondary strips threaded through them the "threading-nest," (designated by E, Fig. 8, Sheet 3.) It is to be remarked, however, that the folding done involves no creasing of the stock, but only springing certain strips from their normal plane form in folding or wrapping each about a certain needle rod or mandrel.

Ordinarily seven strips in one direction and seven in another, locked together, form a cell-case, but any number of strips suitable for the purpose can be used. Herein I show seven each way.

In the drawings, A designates the main strips, and B the secondary strips, and A' the rolls of continuous paper, from which the same are cut by the machine, and $A^2$ the rack holding the rolls, B' the rolls of continuous paper for the secondary strips B, and $B^2$ the rack holding the same, Figs. 8, 10, 11, and 13.

The several continuous sheets of paper A' B' are trained down and through boxes $A^3 B^3$, which are provided with guide rods or rollers $a\ a\ a$ and $b\ b\ b$, Figs. 8, 10, 11, 13, and 17, for keeping the sheets separate. The function of these boxes is to guide the paper in the proper direction laterally into the machine. From these boxes the paper is trained up through the feeding mechanism which feeds up the paper at each successive operation to a distance equaling the width of the strips A and B. This feeding mechanism consists of jigging-frames $A^4$ and $B^4$ in conjunction with a clamping mechanism $A^5$ and $B^5$, Figs. 11, 13, 16, 17, 26, and 27. The jigging-frames consist of the side limbs $a'\ b'$, Figs. 16, 17, 26, and 27, supporting the cross-bars $a^2\ b^2$, to which there are rigidly attached, at the proper distance apart, transverse clamping-bars $a^3\ b^3$, and resting and sliding on these bars $a^2$ and $b^2$ there are clamping-frames $A^6$ and $B^6$. These clamping-frames consist of the rods (one on each side) $a^4\ b^4$, on which are threaded and held by burs the transverse clamping-bars $a^5$ and $b^6$, and secured to these bars $a^3$ and $a^5\ b^3$ $b^5$ are steel plates $a^6\ b^6$, which plates extend upward, entering the slots $A^{13}\ H^{13}$ between the dies, where the paper is cut, and they extend downward, passing between and below the clamping mechanism $A^5$ and $B^5$. This clamping mechanism consists, substantially, of the same mechanism as the jigging-frame, only it is secured rigidly to the frame of the machine $C\ C'\ C^2\ C^3$. Secured to the cross-bars $a^7$ $b^7$ are transverse bars $a^8\ b^8$, and riding on the bars $a^7\ b^7$ are clamping-frames $A^7\ B^7$. These clamping-frames $A^7\ B^7$ are provided with transverse clamping-bars $a^9\ b^9$, connected by the threaded rods $a^{10}\ b^{10}$ and adjusted on said rods by nuts.

The steel plates $a^6\ b^6$ are slotted about midway from the bottom upward to a point just past the transverse bars $a^3\ b^3$. These slots are shown at $a^{31}$, Fig. 10, and $b^{11}$, Figs. 13 and 16. On the transverse bars $a^3\ a^5\ b^3\ b^5\ a^8\ a^9$ $b^8\ b^9$ are fixed rubber projections $a^{30}\ b^{50}$, Figs. 10, 16, and 17, which project through the slots $a^{31}\ b^{11}$ and clamp the paper.

A milled block of metal or other suitable material may be substituted for the rubber. The clamping-blocks are here shown as a section of rubber hose threaded upon the transverse bars and located midway thereon in order to pull the paper from a central point and permit its course laterally to be guided by the boxes $A^3$ and $B^3$. The transverse clamping-bars $a^5\ a^9$ and $b^5$ and $b^9$ are adjustable on the threaded rods $a^4\ b^4\ a^{10}\ b^{10}$, before mentioned, so as to take up the wear on any one clamping-block independently of the other.

The clamping-frame $A^6$, Fig. 16, is actuated by a cam mechanism, described later, connected by the rod $a^{12}$ to the lever $a^{13}$ on the shaft $a^{14}$, connected by the links $a^{15}$ to the pivot $a^{16}$ on the frame $A^6$. The lever thus swung in one direction by the cam mechanism to actuate the clamping devices is instantly swung in the opposite direction whenever the cam mechanism permits by a spring $a^{17}$ acting upon its upper end.

The clamping-frame $A^7$, Fig. 16, is actuated by the spring $a^{18}$, Fig. 13, actuating the lever $a^{19}$, same figure, on a shaft $a^{20}$, connected by the links $a^{21}$ to the frame $A^7$ at $a^{51}$, and this clamping-frame is disengaged by a cam movement, described later, by the rod $a^{22}$, Fig. 16, attached to the lever $a^{23}$ on the shaft $a^{20}$.

The jigging-frames $A^4$ and $B^4$, Figs. 16, 17, and 26, are held in position at the top by gibs $a^{24}$ and $b^{12}$, sliding on ways on the corners of the frame-posts $C\ C'\ C^2\ C^3$, and the bottom in ways formed by the side limbs $a'\ b'$ on either side of the bolt $a^{25}$ and block $b^{13}$, and the frame $A^4$ is moved up and down by the rock-shaft $A^8$ with arms $A^{15}$, pivoted to frame-limbs $a'$, and arm $A^{16}$, pivoted to the rod $A^9$, actuated by a cam movement, described later, and the frame $B^4$, Fig. 17, is moved up and down by the rock-shaft $B^8$, pivoted at $B^{11}$ to frame-limbs $b'$ and actuated by mechanism also described later.

The clamping-frame $B^6$ of the jigging-frame $B^4$ is actuated in clamping by the levers $b^{15}$ $b^{16}$, Fig. 26, connected by link $b^{17}$. Said levers are pivoted on cross-bar of frame at $b^{18}\ b^{19}$, and pivoted to clamping-frame by eyebolts at $b^{20}$ and $b^{21}$ and are actuated by the rod $b^{22}$, connected to a cam movement, described later, and the clamping-frame is released by the spring $b^{23}$. The lower clamping-frame of the feeding mechanism of this folding-nest is shown by Fig. 27 and differs from that last described only in that the spring does the clamping and the cam movement connected by the rod $b^{26}$ releases the clamping during the short period that the paper is being fed forward.

$C\ C'\ C^2\ C^3\ C^4\ C^5$ designate the frame-posts of the machine, $D\ D'$ the main frame-bars and guideways, and $D^4\ D^5$ the lower connecting-bars of the frame. $D^2\ D^3$ designate the cross guideways of the machine, which carry the cross-heads of the punches and knives for the secondary strips in folding-nest H.

Mounted on the front end of the machine and bolted down to the frame-bars D D' is the threading-nest, (designated by E, Figs. 8, 11, 13, 15, and 16.) This nest is composed of plates E' E$^2$, of steel, plans of which plates are shown in Figs. 20 and 21. The drawings show sixteen of these plates, a plate on each side of the sheet of continuous paper and an extra one at each end of the next, one of each set being the die-plate and the other the guide-plate.

The die-plate is designated by E$^2$, Fig. 21, and the guide-plate by E', Fig. 20. The plates are packed apart and riveted together in sets, the guide-plate of one set acting as guide to the die of the other set, and these sets are packed apart from each other about one-fourth of an inch, leaving slots A$^{13}$ for the admission of the continuous paper, and these slots A$^{13}$ are spaced apart exactly to the size desired for the spaces between the strips of a completed cell-case.

Into the slots A$^{13}$ up to the position shown by dotted lines, Figs. 20 and 21, the steel plates $a^6$ extend when in their lowest position, and the sheet of continuous paper A' comes up between them and is punched and cut on the line $e$, Figs. 20 and 21, and the strips thus cut are shoved upward to have threaded into them the secondary strips at the next operation, which operation of threading at the same time punches a new set of strips A and cuts loose a completed case at the top. The object of having the steel plates $a^6$ extend into the slots A$^{13}$ on each side of the paper is that as the dies and punches wear they do not cut clean, and hence force the edges of the paper into the dies, which causes it to stick and clog the slots, but as the steel plates $a^6$ pass up over the face of the die each time the paper is fed forward they clean off the face of the die and force the paper up and out by a positive movement.

The die and guide-plates E' E$^2$ of the nest E, spaced apart, permit the shavings and punchings to drop downward between the plates, whence they are caught by any suitably-arranged wind-blast and carried away by any suitable wind-trunk F. (Shown only in Fig. 8.) As these shavings accumulate rapidly and, owing to the compactness of the mechanism, if not removed, soon clog the machine, this wind-trunk F is a desideratum.

The front guide-plate $e^{50}$, Fig. 16, of the nest E is made heavier than the rest in order to stand the wear, as it sustains the ends of the tubes and punches and knife of that nest. Carried by gibs and sliding on the main frame-bars D D' there is a cross-head G, Figs. 8, 11, 13, 15, 16, 17, and 18, which carries a set of tubes G, Figs. 15, 16, and 18, a set of punches G$^2$, slitting-knives $g$, a cutting-off knife G$^3$, and a lance G$^4$. This cross-head proper has arms extending rearward to connect with a member to which the actuating mechanism is attached.

The tubes G' are cut away at G$^{10}$ on the side adjacent to the gates $e^3$ of the main strips to permit them to pass through as small space as possible. The knife G$^3$ is not quite as wide as the strip A is long or as the sheet of continuous paper A' is wide, and the knife G$^3$ is slitted up at $g^{18}$ the full length that it enters the threading-nest, so that it does not cut the strip A entirely off at this point of its progress in the machine at the slot $e$, but leaves it connected at each end and near the center. The object of this is to prevent the strips A from sticking in the slot and the continuous sheet of paper following shoving past it and it past the strip in advance of it, which has made the completed case, but when the completed case is shoved out at the top the lance G$^4$ cuts loose the central connection and the cutter-bars E$^3$ E$^4$, Fig. 15, on each side of the nest E cut loose the edges. These cutter-bars E$^3$ E$^4$, Fig. 15, are pivoted by links to bars E$^5$ E$^6$, bolted to the top of the nest E, and are notched out on the sides adjacent to the edges of the paper, permitting the paper to be ejected up and out of the nest at the proper time. One side of these notches $e'$ is the cutting edge, which in the forward movement of the bar from the position shown shearing over the top edge of the guide-plate E' cuts asunder the connected edges of the paper.

The bar E$^3$ is pivoted at $e^{46}$ to seven links $e^2$, and they are pivoted at $e^{45}$ to the bar E$^5$. A detail plan view of two of the links $e^2$, in connection with the plates E' E$^2$, is shown by Figs. 24 and 25, Sheet 16. The links $e^2$ not only connect the cutting-bar E$^3$ to E$^5$, but the projection $e^3$ on their ends, when in position shown by Fig. 24, serves to fill out the space $e^4$ in the plate E$^2$, which holds the top side of the strips A when, during the threading of the secondary strip, the gates $e^6$ $e^7$ are thrust aside. The gates $e^6$, $e^7$, and $e^8$ of the main strips spring back of their own elasticity or remain partly open until the case is collapsed for packing, which closes them, and hence were the blocks or links $e^2$ to remain in position of Fig. 24 when the completed case was shoved up and out of the nest E the gates $e^6$ $e^7$ would catch on the projections $e^3$ of $e^2$ and be torn off or clog the slots; but the action of the bar E$^3$ in drawing them back gives a clear space for the gates $e^6$ $e^7$ to pass up and out, even though they be fully extended.

The bar E$^4$ is connected by links $e^9$ $e^{10}$ to the bar E$^6$ and performs no function other than cutting the edges of the connected cases as they come up out of the nest E. The bar E$^3$ is actuated by the lever $e^{11}$, connected to rod $e^{12}$, connected to lever $e^{10}$, which also actuates bar E$^4$, actuated by rod $e^{13}$, connected to bent arm $e^{14}$, pivoted on the axis $e^{15}$, Figs. 13 and 49, and connected by link $e^{16}$ to angle-lever $e^{17}$, pivoted on side of frame at $e^{30}$ and actuated by the rod $e^{18}$, connected to a cam mechanism, described later. This whole mechanism is restored to its normal position after each operation by the spring $e^{19}$, Fig. 15.

The end of the knife $G^3$, Fig. 18, is made a little pointed to secure a shearing action in cutting. This knife is so thin that when the cross-head G is drawn back in the position shown and commences to move forward in threading and cutting the main strips the strain on the knife would cause it to buckle and not cut the paper, so I provide it with supporting-guides $g'\ g^2\ g^3$, which are not fixed to the knife but to the nest E, and the knife slides in them and they slide through holes for the purpose in the cross-head G. The knives $g$ do not punch out a portion of the paper, but simply cut the tops and bottoms of the gates of the main strips, and hence they are thin and require supporting, which is done by fixing a bead $g^4$ on the edge of them, which bead punches out a small hole at the bases of the gates, which is serviceable in preventing tearing. The ends of the punches $g^2$ are made with either the center or sides projecting, giving a shearing action. The ends of the knives $g$ are cut off diagonally to give a drawing cut, and the ends of the several punches and knives $G^2\ g$ are set a little in advance of each other in order to equalize the strain of punching and cutting. The ends $g^{50}$, Figs. 15 and 28, of the tubes $G'$ next to the folding-nest are flared out to more readily admit the needle-rods carrying the secondary strips.

The last secondary strip of the case (shown as $B^{50}$, Figs. 1, 5, 6, $6^a$, and 7) when threaded through, as shown in Figs. 5, 6, and $6^a$, before it is righted up lies outside of the position it occupies in the case, and in order to permit it to right up it must be shoved laterally toward the center of the case. This is done by a set of pusher-bars $e^{20}$, (shown in Figs. 15, 21, 49, 50, 51, and 52,) mounted on a rod $e^{22}$, carried by arms $e^{23}$, mounted on a shaft $e^{24}$, Figs. 13, 15, and 49, running alongside machine to cam-wheel at rear end, described later. The shafts $e^{15}\ e^{24}\ H^8$ are held by bearing-blocks $e^{40}\ e^{41}\ e^{42}\ e^{43}$ on the frame-bar $D'$. After they are threaded the secondary strips B, other than $B^{50}$, spring out into contact with the main strips as soon as the tubes are withdrawn, so that as the needle-rods withdraw they retain their position; but the strip $B^{50}$, being outside of its normal position, does not engage the strips A until it is shoved laterally into position by the pusher-bars $e^{20}$, but shows a disposition to withdraw a little when the needle-rod withdraws. To check this, I put points $e^{25}$, Figs. 21, 49, 50, and 51, on the ends of the pusher-bars $e^{20}$, and the cam movement actuating the device causes the pusher-bars to move forward a little as soon as the tube is withdrawn before the needle-rod starts back, bringing the before-mentioned points $e^{25}$ in contact with the strip $B^{50}$, retaining it in position for its notches to engage the main strips when shoved home by the pusher-bars $e^{20}$. This method of moving the marginal strip laterally to interlock it with the strips of another set may be employed with other forms of locks which, like the form here illustrated, prevent the case when collapsed from coming apart when handling.

I will now proceed to describe the folding-nest H, which is made of a series of cast-iron blocks and steel plates. The steel plates form the dies and the castings the packing between them, and they also furnish the bearing-pivots for the folders and the means for holding the whole to the frame. Enlarged views of the nest are shown in Figs. 22, 28, 47, and 48, in which $D^2\ D^3$ designate the guide-bars, $H^2$ the cast-iron blocks, $H^3$ the steel plates, and $H^4$ the packing-blocks between the ends of the steel plates and the castings. These packing-blocks hold the ends of the plates at such distance from the castings as to form suitable slots $H^{13}$, Fig. 17, for the admission of the continuous paper. A side view of these dies is shown in Fig. 28, Sheet 18. This nest is similar in construction to the nest E, so far as the mechanism for cutting the paper is concerned.

Figs. 17 and 22 show a slot $h$, which allows a knife $J'$, Figs. 8, 15, 17, 28, and 30, and punches $J^2$ to pass through both the castings and the plates for cutting off the paper and forming the notches in the edges of the strips B. Since the notches come in the edges it is more convenient to form at one operation notches on each side of the dividing-line between consecutive strips.

$H^5$, Figs. 17 and 22, designates the folders, and $H^6$ the connecting-rods actuating them. These folders $H^5$ are hinged at $h'$ and are connected by the pivot $h^2$ and eyebolts $h^3$ to the connecting-rod $H^6$. This connecting-rod is made with a back plate $h^4$, connecting a zigzag rib $h^5$, from which an eyebolt extends up to pivot $h^2$. This construction permits a perfect adjustment of the several folders up to their work at all times. The secondary strip $B^{50}$, having to be projected laterally into position with the main strips from outside its normal position, as before described, it must be bent or wrapped around the needle-rods I in the opposite direction from the others, and this is accomplished by connecting the top folder to the bottom connecting-rod, and vice versa, by means of the connecting-arms $h^{15}\ h^{16}$, and for above-described reasons it is necessary that the slot in which the strip $B^{50}$ comes up into position in the folding-nest H should be wider than the rest.

The connecting-rods $H^6$ are connected at pivots $h^9$, Figs. 17 and 22, to links $h^7$, and thence by the rod $h^{10}$, eyebolts $h^{11}$, and arm $h^{12}$ to shaft $H^8$, running back to cam-wheel, described later. The cross-head J, Figs. 8, 15, 16, and 17, carries knife $J'$ and punches $J^2$, which cut the strips B and $B^{50}$, and are made with tapering ends, Fig. 30, in order to produce a shearing action and thus equalize the strain of punching and cutting. The notches in edges of the strip $B^{50}$ are not cut so deeply as those of the strips B, since its cavity in strip A is wider to permit more space for the turning of the gates $e^6$ $e^7$, Figs. 6 and $6^a$, Sheet 2, and the notches in strip $B^{50}$ are cut at a less depth by making an offset $j^{15}$, Fig. 31, in the ends of the punches $J^2$ for the distance that they enter the die-plate for the strip $B^{50}$. The cross-head J is carried on adjustable gibs $J^{15}$, Fig. 16, on the ways $D^2$ $D^3$, and is connected to the cross-head $J^3$, Fig. 17, by the bars $J^4$, connected by eyebolt $J^5$, Fig. 8, to lever-arm $J^6$, connected to rod $J^7$, Fig. 9, which is connected to main cross-head P of the machine by which it is operated.

The needle-rods I, Figs. 15, 17, 22, and 28, are turned to fit the inside of the tubes G', and then flattened on each side to permit the entrance of the secondary strips between them and the folders $H^5$, and to pass by the gates of the main strips in threading, and one end of them is always entered into the tubes G' and thereby supported, and the other ends are fastened into a cross-head K, Fig. 9. The cross-head K is located such a distance back that were the rods I of full size throughout their momentum in rapid operation would be objectionable, and hence those parts which do not enter the tubes are made of less diameter, and the said needle-rods I are turned down for a distance $a$ little in excess of the length of the secondary strips, leaving projections I', Figs. 15, 17, 22, and 28, above and below, so that when the folders $H^5$ press the secondary strip B around said needle-rod I the notches of the strips B will engage the projections I' on the rods, and hence when the rods move forward into the tubes they carry with them the secondary strips, the folders keeping closed meanwhile in the position of the dotted lines $H^9$, Fig. 22.

The knife J is a little narrower than the width of continuous paper B', and is slitted at $j^{50}$, Figs. 15 and 30, up near the center to leave the strips connected together for the same reasons given in describing the threading-nest, and these connections are cut loose by the action of the folders in folding the strips around the needle-rods I. On the top of the folders $H^5$ there are projections $h^{13}$, Figs. 15 and 28, which inclose the tops of the secondary strips and prevent their springing up and out of position when being folded. In place of these projections the whole top of the top folder can be made to extend out for the same purpose. When the rods I are forward in the threading-nest, holding the secondary strips B $B^{50}$ in position to engage the strips A, they are supported by the grooves $i$, Figs. 17, 21, and 22, sliding over pins $g^{16}$, Fig. 20, in the plate E'. The rod at the right, which carries the strip $B^{50}$ has a projection $i'$, Figs. 17 and 22, which rides in a slot $g^{17}$, cut in the plate E', Fig. 20.

At the rear end of the machine are two large sprocket-wheels L, Figs. 9, 10, 12, and 14, on the ends, respectively, of a crank-shaft M, mounted in bearings on the frame of the machine. On the right end of the crank-shaft there is fixed a cam-wheel N. On this cam-wheel there is a cam-block N', Figs. 9, 10, 12, 44, 45, and 46, which actuates a cam-arm $n$ on the shaft $H^8$, actuating the folders $H^5$, before described. On this shaft $H^8$ there is an arm $n'$, Figs. 9 and 14, attached to a spring $n^2$, supported by a rod $n^3$, which spring throws back the cam-arm $n$ and opens the folders $H^5$. On the cam-wheel N there is also a cam-block $N^2$, Figs. 12, 14, and 45, actuating a cam-arm $n^4$, Figs. 9 and 14, actuating the shaft $e^{24}$, which actuates the pusher-bars $e^{20}$, before described, and a spring $n^5$, attached to the frame-post $C^4$ and connected to an arm $n^6$, Figs. 9 and 14, on shaft $e^{24}$, draws back the shaft and pusher-bars.

On the cam-wheel N there is a cam-block $N^3$, Figs. 9, 12, 14, and 46, which actuates a cam-lever $n^7$, which actuates the rod $e^{18}$ and through it the cutter-bars $E^3$ $E^4$ of the threading-nest, before described. Springs $n^8$ return this mechanism to its normal position.

On the crank-shaft M there is a pitman O, connected to the main cross-head P of the machine, Fig. 9. This cross-head P is held on ways on the main frame-bars D D' by gibs and has a shaft P', (extending across its width,) the left end of which extends outside the frame and is provided with a roller $P^2$ to roll in contact with the cam-arms S S' $S^2$ $S^3$, Figs. 9, 23, and 33, which actuate the clamping devices of the feeding mechanism. To this shaft P' the pitman O is connected.

In the central and forward end of the cross-head P there is a vertical shaft $P^3$, to which the connecting-rod $J^7$ is attached, Fig. 12, to actuate the cross-head J. The lower end of this pin $P^3$ in moving to its other limit of motion comes in contact with the cam-arms R R', Figs. 9, 12, 14, and 17, which actuate the vertical shaft $R^2$, which is connected by the lever $R^3$, link $R^4$, and lever $R^5$ to shaft $B^3$, which raises and lowers the jigging-frame $B^4$, feeding the paper into folding-nest H.

On the left side of the cross-head P on the shaft P' there is a connecting-link $P^4$, Figs. 9, 29, 33, $33^a$, 34, 35, and 36, which has a slot $P^5$, in which slides a wrist-pin $k$ of a rock-shaft K', pivoted to the cross-head K, by which mechanism the cross-head K is driven by cross-head P. On the other side of the pitman O there is a space on the shaft P, which, as the cross-head moves forward, enters the opening $t$, Figs. 9, 14, 29, 33, $33^a$, 34, 35, 36, 37, and 38, of the link T, abuts against the bottom of said opening, and drives the link forward. The link T is pivoted to a rock-shaft T' on the cross-head G, and thus the cross-head G is actuated by the cross-head P.

The link T is supported in position to properly engage the shaft P' by the link $t'$, connected to the link $t^2$, supported by the cross-arm $t^3$, riding on the needle-rods I, and the link $t^2$ is connected to the cross-head G' at $t^4$.

The rock-shaft K' of the cross-head K is provided at its ends with locking-arms $k'$ $k^2$, Figs. 9, 12, 29, and 40, and at each end of the stroke of the cross-head K there are abutment-blocks $k^6$ $k^7$, of rubber, which, in conjunction with the locking-arms $k'$ $k^2$ and the locking-bars $k^3$ $k^4$, hold the cross-head in an exact position as it rests at each end of the stroke. The locking-bars $k^3$ $k^4$ are four in number, two on each side, one set for each end of the stroke, and they lie side by side with their outer ends projecting upward and abutting against screws $k^8$ $k^{15}$, by which they are adjusted to take up the wear and are held to the frame by screws $k^{17}$. Their operation is thus: The cross-head P moves forward and the link $P^4$ slides on the wrist-pin $k$ till the end of the link is reached, when the rock-shaft K' revolves until the arms $k'$ come in contact with the bars $k^3$ and the arm $k^2$ has revolved up and out of contact with the bar $k^4$, when the cross-head moves forward till the cross-head K comes in contact with the rubber abutment-blocks $k^7$. Then the rock-shaft K' again revolves slightly as the arms $k'$ drop into engagement with the ends of the locking-bars $k^3$, by which time the cross-head P is at its full extension and the cross-head K rests locked in exact position between the blocks $k^7$ on one side and the ends of the bars $k^3$ on the other until cross-head P returns to the limit of the length of the slot $P^5$ in link $P^4$, when it again unlocks cross-head K by rocking the shaft K' and carries it back and locks it against the other end, &c.

The operation of cross-head G is similar, only it rests only at position shown in drawings and is unlocked by and carried forward and back with cross-head P from and to its normal position. This is accomplished by the link T and rock-shaft T' with its locking-arms $t^5$ and locking-bars $t^6$. On the cross-head P there is a steel block $P^6$, Figs. 9, 29, 33, 33ª, 34, 35, and 36, which has a projection $P^7$ for engaging link T and a projection $P^{20}$, Fig. 29, which is for the purpose of adjusting the block on the cross-head P, a set-screw working in the projection and against the cross-head serving to accomplish this result. In the link T there is a steel block $t^7$, Figs. 37 and 38, projecting out on the right side thereof, and as the cross-head P moves forward to the point of contact of the shaft P' and link T the projection $P^7$ passes over and just beyond the steel block $t^7$. As the link T is now pushed onward by P' it swings the arms $t^5$ upward about the axis of the rock-shaft T', raising them out of engagement with the locking-bars $t^6$ and at the same time raising the block $t^7$ into engagement with the projection $P^7$. The cross-head G now moves forward with the cross-head P. On the return of the latter the arms $t^5$ at first ride on the bars $t^6$, but, together with the arms $t^5$, links T, and block $t^7$, they drop when the ends of those bars are reached. The cross-head G has thus an interval of rest in the position shown in full lines in Figs. 9 and 33.

On the sides of cross-head G there are rubber abutment-blocks $t^9$, Figs. 9, 12, and 33, which abut against the bracket $t^{10}$ to hold it in position. The bars $t^6$ are adjusted by a set-screw $t^{12}$, Fig. 12, working in the bracket $t^{10}$ and engaging the upturned end $t^{11}$ of the bar. The cross-head J, carrying punches and knife, is not required to travel as far as the full movement of the cross-head P would carry it, and hence the rod $J^7$ is slotted to permit its sliding on the pivot $j$.

The strain of punching and cutting the paper in the nest H is done by a pulling strain on the rod $J^7$, Figs. 8 and 9, and as the cross-head P moves forward the punches and knives of the nest H are shoved back to their normal position out of the way of the feeding of the paper B' by the thrust of the end of the rod $J^7$ against the flange $j'$ of the lever $J^6$. This thrust swings the lever $J^6$, and the end of the arm $J^7$ slides along the flange and at last slips off its end. The arm now slides onward freely, the pin $j$ simply traversing the slot, and the cross-head rests until in the return movement of the arm $J^7$ the outer end wall of the slot again strikes the pin, pulling the lever inward.

The jigging-frame of the feeding mechanism of the threading-nest E is actuated by the rod $A^9$, connected to the cam-lever V, Figs. 12 and 23, which lever has two arms V' $V^2$ and is pivoted to the frame $D^4$ at $v$. By the back stroke of the cross-head P the roller $P^2$ on the shaft P' passes over the top of the arm $V^2$, as shown by the dotted lines, Fig. 23, and comes in contact with the arm V' and thus forces it back, thereby lifting the jigging-frame of the feeding mechanism. On the movement forward of the cross-head P the lever V remains at rest until the roller $P^2$ comes in contact with the arm $V^2$, (since the jigging-frame is counterbalanced by the coil-spring $A^{10}$ on the shaft $A^8$, Fig. 13,) when the arm V is moved forward, carrying down the jigging-frame. The object of this period of rest in the up position of the jigging-frame is to give time for clamping and unclamping the paper by the action of the cam-arms S S'. Substantially the same mechanism is shown in the two arms R and R' of the shaft $R^2$, Fig. 9, before described.

The cam-levers S S' $S^2$ $S^3$, Fig. 23, actuate the clamping mechanism of the feeding mechanism. The roller $P^2$ on the shaft P', as the cross-head P moves back, comes in contact with the lever S' at the point $S^4$ and raises it, which causes the lower arm of the same lever to pull on the rod $a^{12}$, which clamps the paper in the jigging-frame $A^4$, and as the roller $P^2$ moves on it raises the lever S by coming in contact with it at the point $S^5$, thereby pulling on the rod $a^{22}$, which unclamps the paper at the frame $A^5$, and this is done before the roller $P^2$ comes in contact with the arm V', which feeds the paper. On the return stroke the roller $P^2$ passes the points $S^4$ $S^5$ before it comes in contact with the arm $V^2$, which shoves back the jigging-frame, and thus the clamps are actuated to clamp and unclamp to feed the paper forward only.

The lever-arms $S^2$ $S^3$ operate substantially the same as $S$ $S'$, only the points $S^6$ $S^7$ move down instead of up, causing a pulling strain on the rods $b^{22}$ and $b^{26}$, clamping and unclamping the paper in the feeding mechanism of the folding-nest, and the jigging-frame $B^4$ is actuated by the contact of the pin $P^3$ with the arm R on the shaft $R^2$, before described, and the position of the arm R is such that the roller $P^2$ passes the points $S^6$ $S^7$ before the pin $P^3$ strikes arm R. Thus the paper is clamped by the cam-arm $S^3$ and rod $b^{22}$ and unclamped by cam-arm $S^2$ and rod $b^{26}$ before the jigging-frame $B^4$ moves up. The frame remains raised until the pin $P^3$ on its back stroke comes in contact with the arm $R'$, Fig. 9, which it does not do until the roller $P^2$ has passed back of points $S^6$ $S^7$, unclamping the jigging-frame $B^5$, when the pin $P^3$ against the arm $R'$ carries back the jigging-frame $B^4$.

The operation of the machine is thus: The operator places the rolls of continuous pasteboard or strawboard or other suitable material on the racks $A^2$ $B^2$ and trains the ends through the boxes and up into the feeding mechanism. When the power is applied to the wheels L, the crank M turns and shoves forward the cross-head P and actuates the mechanism, as before described. The first two or three revolutions free and punch all the paper sheets and bring perfect strips in order in all slots $H^{13}$ $A^{13}$, though at first a few defective cases will be made until the paper is all up in uniform positions. The cross-head P moves forward, pushing back the cross-head J with its knives and punches and pushes down the jigging-frame $A^4$ for a new hold on the paper in the threading-nest, and on its first movement forward the cam-wheel closes the folders $H^5$, thereby folding the strips of paper B tightly on the needle-rods I. This folding is done while the wrist-pin $k$ is sliding in the slot $P^5$ of the link $P^4$ and the folders are closed before the end of the slot is reached, when the link $P^4$ unlocks the cross-head K and carries it with it, which pushes the needle-rods forward, carrying with them endwise the strips of paper B into the tubes $G'$, the folders $H^5$ remaining closed until the strips of paper B are entirely within the tubes, when they open, leaving a clear way for feeding a new set of strips up in front of the folders, which is done as the cross-head P comes to its forward limit by the pin $P^3$ moving the arm R, and when the needle-rods I have carried the strips B entirely within the tubes $G'$ the shaft $P'$ comes in contact with the link T and unlocks the cross-head G and carries it simultaneously with the rods and paper inside the tubes forward into and through the threading-nest, the rods I and tubes $G'$ pushing aside the gates of the main strips A in the top of the threading-nest. Simultaneously with this the punches and knives of the cross-head G pass through the seven sets of dies and cut seven strips more. When the cross-head P is at its full stroke, the cross-head K is locked in place exactly for the projections $I'$ on the rods I and notches of the strips B within the tubes to correspond with the edges of the main strips A in the threading-nest, and these rods I are held there during the travel of the cross-head P backward the length of the slot $P^5$ of the link $P^4$; but the cross-head G travels back to its normal position with the movement of the cross-head P, thereby withdrawing the tubes and uncovering the strips of paper B in the nest E, which strips immediately spring into locking contact with the strips A, excepting the strip $B^{50}$, which is forced into locking connection by the pusher-bars $e^{20}$, (which commence to move up as soon as the tubes $G'$ are off the strips B $B^{50}$,) and when the cross-head G gets back to its normal position the cross-head K, carrying the needle-rods I, moves back with the cross-head P, and when the rods I are withdrawn from the threading-nest, and during the travel of the rods I back through the tubes $G'$, the jigging-frame of the threading-nest feeds up the paper in the nest E and pushes out the finished case just threaded. At the next forward movement of the cross-head G the completed case on the top of the nest E is cut entirely from the other strips following by the lance $G^4$ and cutter-bars $E^3$ $E^4$, and is taken off by the operator, and so on *ad libitum*.

What I claim is—

1. In a cell-case machine, the combination with devices for feeding into position, in parallel planes and with their ends in a plane, a set of sheets corresponding in number to the strips in one set of a completed cell-case and in width to the length of a cell-case strip, of mechanism having a cutting-die for each sheet arranged to form and cut transversely from the end of each sheet a cell-case strip, and means for interlocking transverse strips with the set of strips so formed.

2. In a cell-case machine, the combination with mechanism for holding a set of sheets corresponding in number and relative position to one set of strips in a completed cell-case, of mechanism for holding a second set of strips at right angles to the planes of the sheets of the first set, mechanism for forming across the end of each sheet a cell-case strip, and devices arranged to bring the two sets of strips thus formed into interlocking position.

3. In a cell-case machine, the combination with devices arranged to feed into position, in parallel planes and with their ends in a plane, a set of sheets equal in width to the length of the strips in one set in a cell-case and in number to the strips in said set, of dies lying alongside the end portions of the sheets so placed, punches arranged to pass transversely through all said dies to perforate strips forming the terminal portions of said sheets, and means for detaching the strips thus perforated.

4. The combination with mechanism arranged to hold in registering position a set of sheets equal in number to the strips of one set in a completed cell-case, of mechanism for forming and partially severing a transverse strip at the end of each sheet, devices arranged to feed the sheets simultaneously the width of a strip, and devices arranged to complete the severing after such feeding.

5. In a cell-case machine, the combination with devices for holding as many distinct rolls of stock as there are strips in a cell-case to be formed, means for feeding the stock from the several rolls, means for forming and cutting, transversely, from the end of each sheet of stock a cell-case strip, and means for throwing the strips so formed into interlocking position to form a cell-case.

6. Mechanism for feeding and holding a set of sheets corresponding in number and position to the strips of one set in a completed cell-case, of mechanism for feeding and holding alongside the first set a similar set of sheets perpendicular to the planes of the strips of the first set, means for cutting a transverse strip from the end of each sheet, and means for carrying one set of strips longitudinally into engagement with the other set.

7. The combination with devices for holding with their end margins in a plane a set of sheets equal in number to one set of strips in a complete cell-case, of mechanism for holding a second set of sheets alongside the first set, perpendicular to the latter and with their ends in approximately the plane mentioned, means for severing a strip from each sheet, and means for moving the strips of the second set longitudinally into position to interlock with the strips of the first set.

8. The combination with devices for holding a set of formed cell-case strips in the relative position they occupy in the completed cell-case, of means for holding a second set properly spaced and at right angles to those of the first set, means for moving the second set longitudinally through the strips of the first set, and means for then pushing the marginal strip of the second set laterally to facilitate its interlocking.

9. The combination with devices arranged to feed continuous sheets equal in width to the length of a cell-case strip into position with their ends spaced like the strips forming one set in a completed cell-case, of means for severing all the sheets transversely to form a set of cell-case strips in position, and means for interlocking transverse strips with the set of strips so formed.

10. The combination with mechanism for holding spaced and in registering position a set of formed cell-case strips, of mechanism for springing from their plane form the strips of a transverse set, to permit their interlocking with the strips of the first set, and means for throwing the two sets into interlocking position while the strips are so sprung.

11. The combination with mechanism for feeding in two sets as many sheets as there are strips in a completed cell-case, of means for forming from the two sets of sheets sets of strips that cannot interlock while both are plane, means for springing the strips of one set out of plane form, and means for bringing the two sets into interlocking position.

12. The combination with means for holding one set of strips in position, of mandrels for supporting, respectively, the strips to be interlocked with the strips of said set, devices for bending and holding the strips around said mandrels, respectively, means for carrying the strips so held into interlocking position, and devices for releasing the strips after such position is reached.

13. The combination with means for holding one set of strips, of traveling mandrels arranged alongside said set to support, respectively, strips to be interlocked with the strips of the first set, means for placing strips alongside said mandrels, respectively, and devices traveling with said mandrels and arranged to bend the strips last named about said mandrels, respectively.

14. In a cell-case machine, the combination with devices for feeding two sets of sheets equal in number to the strips forming the two sets in a cell-case, of mechanism arranged to form simultaneously across the ends of one set of sheets the strips of one set, mechanism for forming simultaneously across the ends of the other sheets the strips of the second set, and mechanism arranged to bring simultaneously all the strips of one set into position to interlock with those of the other set.

15. The combination with means for holding one set of strips in position, of mandrels for supporting, respectively, strips to be interlocked with those of said set, means for placing strips alongside said mandrels, respectively, devices for holding each of the strips last named fixed with reference to its mandrel, and means for advancing said mandrels and devices together through the strips of said set and returning them separately.

16. The combination with means for holding in registering position a set of cell-case strips, of a set of transverse rods arranged in line, respectively, with the registering perforations of said set and adapted to carry, respectively, the strips of a transverse set, and means for advancing the rods longitudinally through the perforations of the strips of the first set and again returning them to initial position.

17. The combination with means for feeding sets of sheets corresponding in number and position to one set of strips in a complete cell-case, of means for forming interlocking cuts in the end portions of said sheets while they are in such position, means for interlocking with them a second set of strips, and means arranged to then detach from the sheets first mentioned portions equal in width to the strips interlocked with them.

18. The combination with means for holding a set of strips in registering position, of a set of transverse reciprocating rods lying in the plane of said set and adapted to carry respectively, the strips of a second set to be interlocked with those of the first set, means for placing the strips of said second set in position to be carried by the rods, and means for bending the strips so placed from plane form.

19. The combination with means for holding one set of strips in position, of means for thrusting the strips of a second set through the strips of the first set.

20. The combination with means for holding a set of perforated strips, of devices arranged to bend into form for passing through the perforations strips which cannot pass while unbent, and means for thrusting the strips so bent through the perforations of the first set.

21. The combination with means for holding in position a set of cell-case strips, of devices holding separately all the strips of a set to be interlocked with the first set, and means for simultaneously advancing all the strips of the second set into position for interlocking with the strips of the first set.

22. The combination with devices for feeding into a machine a set of continuous sheets of cell-case stock, of strip-forming dies, and devices connected with the feeding mechanism and arranged to pass over and forcibly clear the faces of the dies when the sheets are fed forward.

23. The combination with the strip-forming die, of a stock-feeding mechanism consisting in part of a device adapted to grip and carry forward the stock and provided with a plate arranged to be carried over the face of the die by the feeding movement.

24. The combination with means for holding in registering position a set of strips having perforations to receive the strips of a second transverse set, of a set of reciprocating rods registering with said perforations and adapted to carry through them, respectively, the strips of the second set, means for placing the strips of the second set in position to be carried by the rods, means for bending them from plane form, means for advancing the strip-bearing rods longitudinally through the perforations, means for holding the strips so bent during such advance, and means for withdrawing the rods.

25. In mechanism for feeding a set of sheets for forming cell-case strips, a series of bars arranged alongside the paths of the sheets, respectively, a second series of bars lying alongside the bars of the first series, a set of transverse bars connecting the bars of the second series, means for separately adjusting the bars of the second series upon their connecting-bars, and means for at intervals moving the bars of the second series toward and away from the bars of the first series, to clamp and release the sheets.

26. The combination with the set of relatively-fixed parallel bars lying alongside the paths of a series of sheets to be fed, of a second set of bars mounted alongside the bars of the first set, respectively, but upon opposite sides of said paths, means for moving the bars of the second set toward and away from those of the first set to clamp and release the sheets, and means for at intervals moving the two sets, together, parallel to said paths.

27. The combination with means for feeding intermittently a set of parallel sheets from the ends of which sets of strips are to be cut transversely, of die-plates lying alongside the paths of the sheets and provided with a series of openings for strip-forming punches and with a parallel set of openings for a set of transverse strips, and means for threading a set of strips through the openings last named.

28. The combination with a set of dies equal in number to the strips in one set in a completed cell-case, of a set of guide-plates alternating with said dies and forming with them ways for the sheets from which strips are to be cut, said dies and plates being rigidly united and provided with perforations to allow punches to pass transversely through the whole.

29. In a cell-case machine having cutting mechanism in two sets, each set cutting at each operation all the strips which run in the same direction of the case, said cutting mechanism actuated by mechanism whereby only one set of said cutting mechanism is cutting at a time, thereby equalizing the strain on the machine, substantially as shown.

30. The combination with two mechanisms for feeding two sets of stock-sheets, of two mechanisms for forming strips at the ends of the sheets of the sets, mechanism for bringing the strips so formed into position for interlocking, and actuating mechanism arranged to feed the first set of sheets, form strips from the second set of sheets and bring two sets of strips into position for interlocking, all in one period of time, and to form strips from the first set of sheets and feed the second set of sheets in another period.

31. The combination with devices for holding in a plane a set of strips having suitable central registering perforations to receive transverse strips, of a set of reciprocating tubes arranged in line with said perforations to hold, respectively, partially-rolled transverse strips, and means for thrusting the tubes through the perforations in the strips of the other set and again withdrawing them.

32. The combination with means for holding in position a set of centrally-perforated cell-case strips, of a set of transverse tubes mounted in the same plane at one side of the set of strips, a set of needle-rods mounted in line, respectively, with said tubes, means for rolling a second set of strips about said rods, respectively, means for sliding said rods with the rolled strips within the tubes, means for advancing the rods, strips and tubes through the perforations in the strips of the first set, and means for releasing the strips so carried and returning the rods and tubes to their initial positions.

33. The combination with means for holding a suitably-formed set of strips, of means for projecting the strips of a second set through the strips of the first set, and means for pushing the last of the second set laterally to interlock it with the strips of the first set.

34. The combination with means for holding in position a set of suitably-formed strips, of a laterally-open tube carrying a partially-rolled strip through the ends of the strips of said set, and a bar provided with a sharp point arranged to press transversely against said strip to prevent longitudinal displacement.

35. The combination with means for holding a set of centrally-perforated strips in registering position, of transverse needle-rods flattened upon one side for the purpose set forth and arranged to reciprocate through the registering perforations, and means for bending the strips of a second set about said rods, substantially as set forth.

36. The combination with devices for holding in position a set of centrally-perforated strips, of needle-rods provided with lateral projections and arranged in the plane, and at one side, of said strips, means for laterally notching the strips of a second set, means for bending them about the needle-rods, respectively, with their notches in engagement with said projections, means for holding them thus bent, means for sliding the rods through the perforations in the strips of the first set, means for releasing the strips, and means for withdrawing the rods.

37. The combination with the set of bell-mouthed tubes, of the needle-rods in line with the tubes, respectively, the clamps for bending strips about the rods, means for placing a set of strips in position alongside the rods, respectively, means for simultaneously actuating all the clamps, means for sliding all the rods within the tubes, and means for simultaneously sliding all the tubes longitudinally to bring the strips contained therein into position to interlock the strips of another set.

38. The combination with means for laterally notching and bringing into position a set of strips to be thrust through the strips of a transverse set, of a set of rods provided with projections corresponding with the notches of the strips of the first set, means for bending the notched strips about the rods, respectively, means for sliding the rods back and forth longitudinally, and means for locking the rods temporarily in exact position at proper points in their paths.

39. The combination with devices for holding a set of strips, of rods to carry through them the strips of a second set, means for bending the last-named strips about said rods, tubes arranged to hold the strips thus bent, means for sliding the tubes and rods through the strips of the first set, and means for locking the tubes at a predetermined point in their paths.

40. The combination with devices for holding a set of formed strips in position, of mechanism for holding, while out of position, a second set of strips to be interlocked with those of the first set, devices arranged to move said mechanism and carry the strips held thereby into position for interlocking with the strips of the other set and to return it to its normal position, and means for locking said mechanism exactly in position at each end of its path.

41. In a machine for the manufacture of cell-cases, substantially as described, having nest H and nest E substantially as described, and cross-heads bearing tubes G' and needle-rods I carrying strips from nest H to nest E, substantially as shown.

42. In a cell-case machine a set of dies arranged in a series for cutting strips of material for a cell-case, one die of the set having smaller notches than the other and a set of punches $J^2$ with offsets $j^{15}$ for the distance they enter said die, for the purpose described.

43. The combination with devices for holding the ends of a series of sheets in position, of means for forming said ends for interlocking by a set of transverse strips, means for interlocking with them such transverse set, and devices arranged to detach from each of said sheets, after such interlocking, a transverse portion equal to said strips in width.

44. In a cell-case machine, the combination with a series of transverse cell-strip holders, of a longitudinal cell-strip holder for inserting a longitudinal cell-strip through the holes or openings in the series of transverse strips.

In witness whereof I have hereunto subscribed my name in the presence of two witnesses.

WILLIAM ERASTUS WILLIAMS.

Witnesses:
CHAS. P. DAWLEY,
R. E. DAWLEY.